(12) United States Patent
Schelter et al.

(10) Patent No.: US 10,704,122 B2
(45) Date of Patent: Jul. 7, 2020

(54) SIMPLE CHEMICAL METHOD FOR THE SEPARATION OF RARE EARTH METALS

(71) Applicant: THE TRUSTEES OF THE UNIVERSITY OF PENNSYLVANIA, Philadelphia, PA (US)

(72) Inventors: Eric J. Schelter, Philadelphia, PA (US); Justin A. Bogart, Brooklyn, NY (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 602 days.

(21) Appl. No.: 15/321,209

(22) PCT Filed: Jul. 29, 2015

(86) PCT No.: PCT/US2015/042703
§ 371 (c)(1),
(2) Date: Dec. 22, 2016

(87) PCT Pub. No.: WO2016/019044
PCT Pub. Date: Feb. 4, 2016

(65) Prior Publication Data
US 2017/0204498 A1      Jul. 20, 2017

Related U.S. Application Data

(60) Provisional application No. 62/030,227, filed on Jul. 29, 2014.

(51) Int. Cl.
*C22B 59/00*  (2006.01)
*C22B 3/20*   (2006.01)
(Continued)

(52) U.S. Cl.
CPC ............... *C22B 59/00* (2013.01); *C22B 3/20* (2013.01); *C22B 3/44* (2013.01); *C22B 7/006* (2013.01); *C25C 1/22* (2013.01); *Y02P 10/234* (2015.11)

(58) Field of Classification Search
CPC .. C22B 59/00; C22B 3/20; C22B 3/44; C25C 1/22; Y02P 10/234
See application file for complete search history.

(56) References Cited

U.S. PATENT DOCUMENTS 8,177,881 B2      5/2012   Sugahara et al.
2010/0319491 A1*  12/2010  Sugahara .............. C22B 3/0022
                                                            75/743

FOREIGN PATENT DOCUMENTS

CN       1119216 A       3/1996
CN       1693493 A      11/2005
(Continued)

OTHER PUBLICATIONS

Bogart, Justin A. et al., "An Operationally Simple Method for Separating the Rare-Earth Elements Neodymium and Dysprosium", Angew. Chem. Int. Ed., 54: 8222-8225 (2015).
(Continued)

*Primary Examiner* — Colleen P Dunn
*Assistant Examiner* — Anthony M Liang
(74) *Attorney, Agent, or Firm* — Robert C. Netter, Jr.; Dann, Dorfman, Herrell & Skillman

(57) ABSTRACT

A method is provided for separating mixtures of different rare earth metals using a ligand having a size-sensitive molecular aperture. The present invention meets the needs in the field by providing method of separating and purifying rare earth metals. The object of this invention is to separate and purify rare earth metals, e.g., the more valuable Dy away from Nd, in mixtures containing such metals using a simple
(Continued)

chemical process without the need for countercurrent liquid-liquid separations.

17 Claims, 27 Drawing Sheets

(51) Int. Cl.
  *C22B 3/44* (2006.01)
  *C22B 7/00* (2006.01)
  *C25C 1/22* (2006.01)

(56) References Cited

FOREIGN PATENT DOCUMENTS

| CN | 102912134 A | 2/2013 |
|---|---|---|
| WO | 2015/083292 A1 | 6/2015 |

OTHER PUBLICATIONS

International Search Report/Written Opinion, dated Oct. 26, 2015, issued in corresponding International Applicatio No. PCT/US2015/042703.
Binnemans, et al., "Recycling of rare earths: a critical review" Journal of Cleaner Production (2013) 51:1-22.
Johnson, et al., "Cooperative Thermodynamic Control of Selectivity in the Self-Assembly of Rare Earth Metal-Ligand Helices" J. Am. Chem. Soc. (2013) 135(47):17723-17726.
Vander Hoogerstraete, et al., "From NdFeB magnets towards the rare-earth oxides: a recycling process consuming only oxalic acid" RSC Adv. (2014) 4:64099.
Xie, et al., "A critical review on solvent extraction of rare earths from aqueous solutions" Miner. Eng. (2014) 56:10-28.
Yuan, et al., "Solvent Extraction of Lanthanides in Aqueous Nitrite Media by Cyanex 302" Acta Metall. Sin. (1995) 8:10-14.
Zhao, et al., "Size-Selective Crystallization of Homochiral Camphorate Metal—Organic Frameworks for Lanthanide Separation" J. Am. Chem. Soc. (2014) 136(36):12572-12575.

\* cited by examiner

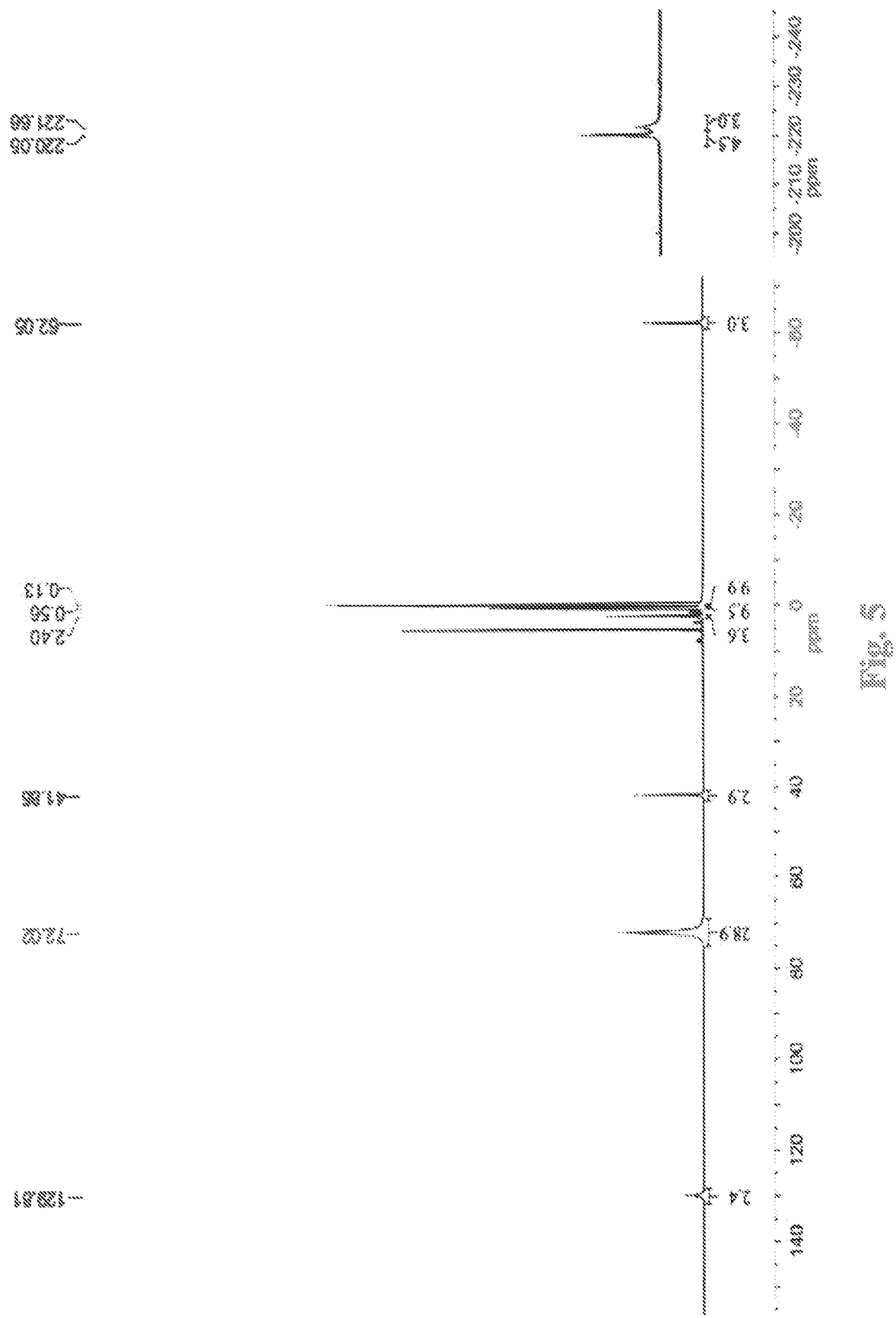

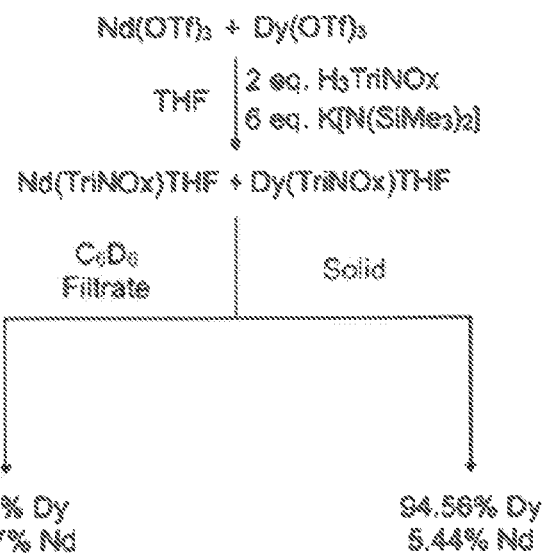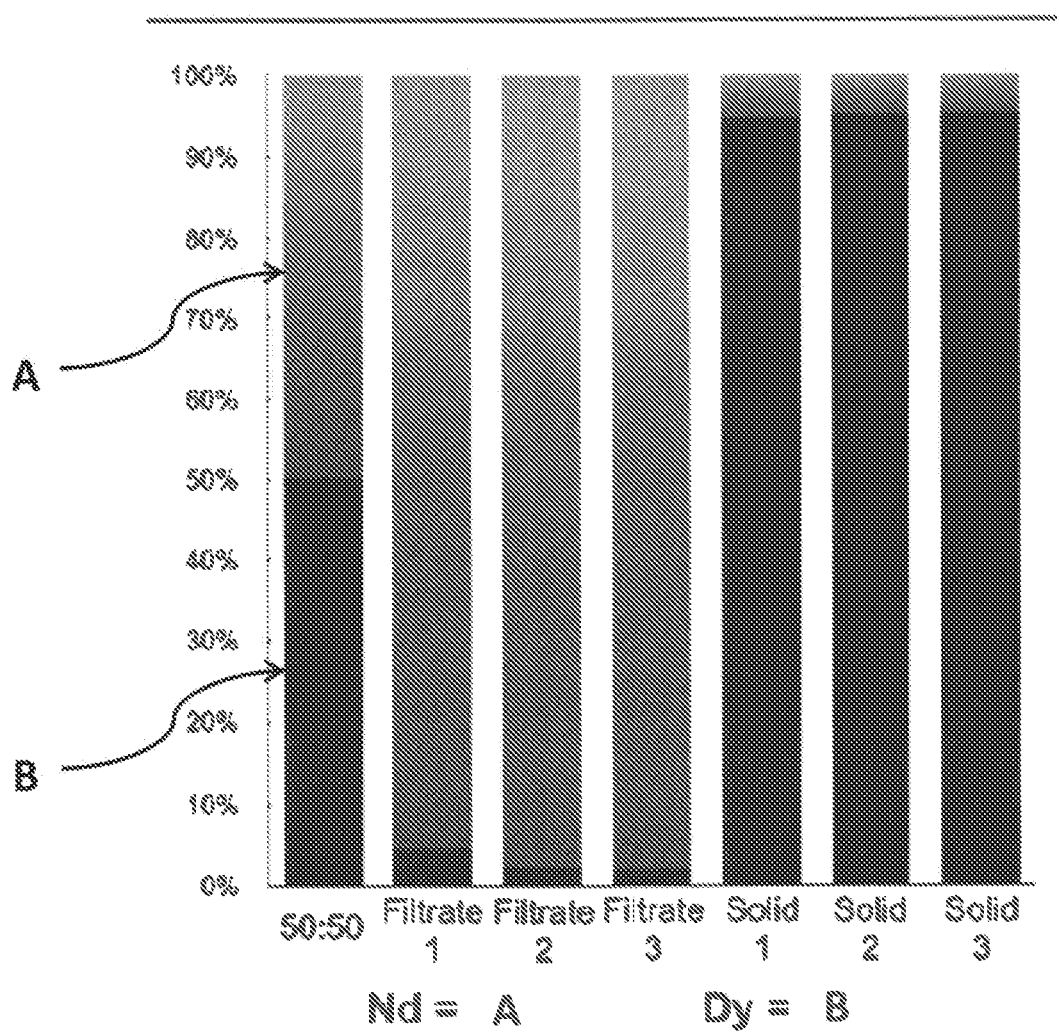
Fig. 16

Method A
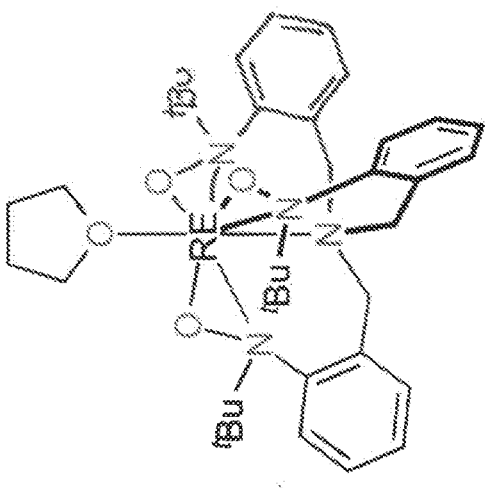
RE[N(SiMe$_3$)$_2$]$_3$
+
H$_3$TriNOx
$\xrightarrow[-3\ \text{H[N(SiMe}_3)_2]}{\text{THF/Hex}}$
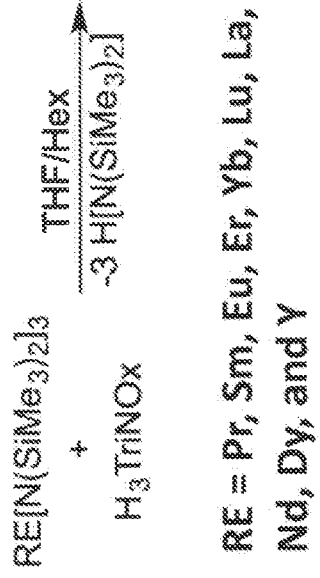
RE = Pr, Sm, Eu, Er, Yb, Lu, La, Nd, Dy, and Y
Method B
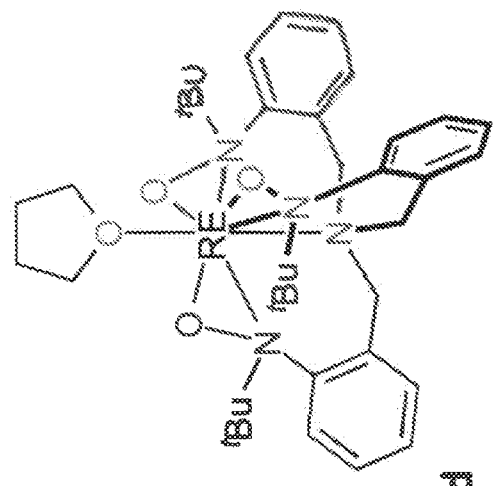
RE(OTf)$_3$
+
H$_3$TriNOx
+
3 K[N(SiMe$_3$)$_2$]
$\xrightarrow[\substack{-3\ \text{H[N(SiMe}_3)_2] \\ -3\ \text{KOTf}}]{\text{THF}}$
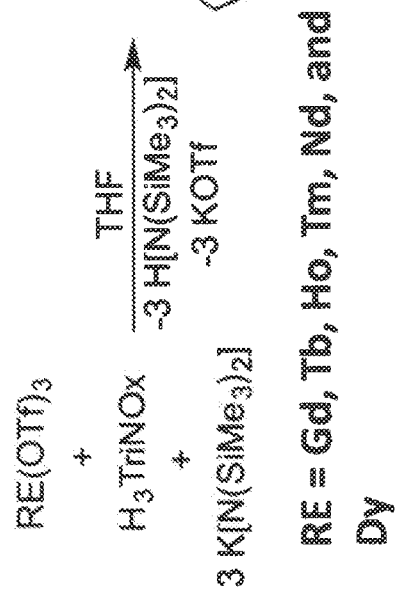
RE = Gd, Tb, Ho, Tm, Nd, and Dy
Fig. 18

| | N–O | RE–O$_{nitroxide}$ | RE–N$_{nitroxide}$ | RE–O$_{THF}$ | %V$_{bur}$ | K$_{eq}$ of dismutation |
|---|---|---|---|---|---|---|
| 1-La | 1.441(2) | 2.3219(16) | 2.6022(17) | 2.595(6) | 78.6 | $3.2 \pm 0.9 \times 10^3$ |
| 1-Ce | 1.433(2) | 2.2921(18) | 2.581(2) | 2.577(6) | 79.1 | $2.4 \pm 0.2 \times 10^2$ |
| 1-Pr | 1.424(3) | 2.270(2) | 2.569(3) | 2.573(8) | 79.6 | $1.2 \pm 0.1 \times 10^1$ |
| 1-Nd | 1.420(4) | 2.260(3) | 2.554(4) | 2.546(9) | 79.9 | $2.4 \pm 0.2$ |
| 1-Sm | 1.429(3) | 2.236(3) | 2.547(3) | 2.545(10) | 80.4 | $2.4 \pm 0.9 \times 10^{-2}$ |
| 1-Eu | 1.438(2) | 2.2270(16) | 2.5286(19) | 2.506(5) | 80.9 | $(3.6 \times 10^{-3})$ |
| 1-Gd | 1.437(4) | 2.220(3) | 2.529(4) | 2.530(10) | 81.0 | $(5.6 \times 10^{-4})$ |
| 1-Tb | 1.444(2) | 2.2054(18) | 2.514(2) | 2.501(6) | 81.3 | $(8.7 \times 10^{-5})$ |
| 1-Dy | 1.424(4) | 2.180(3) | 2.508(3) | 2.487(10) | 81.3 | $(1.3 \times 10^{-5})$ |
| 1-Y | 1.4429(17) | 2.1784(13) | 2.4966(15) | 2.469(3) | 81.7 | $(4.2 \times 10^{-6})$ |
| 1-Ho | 1.433(5) | 2.189(4) | 2.506(5) | 2.509(10) | 81.5 | $(2.4 \times 10^{-6})$ |
| 1-Er | 1.439(4) | 2.162(3) | 2.487(4) | 2.484(10) | 82.3 | $(4.9 \times 10^{-7})$ |
| 1-Tm | 1.446(5) | 2.151(4) | 2.483(6) | 2.477(11) | 82.5 | $(1.2 \times 10^{-7})$ |
| 1-Yb | 1.441(5) | 2.151(4) | 2.474(5) | 2.447(7) | 82.3 | $(3.2 \times 10^{-8})$ |
| 1-Lu | 1.452(4) | 2.134(4) | 2.480(5) | 2.428(8) | 82.6 | $(1.0 \times 10^{-8})$ |

Fig. 19

| RE1 | RE2 | | | | | | | | |
|---|---|---|---|---|---|---|---|---|---|
| | Gd | Tb | Dy | Y | Ho | Er | Tm | Yb | Lu |
| La | 0 | 91.0 | 182 (0) | 341 | 834 | 176 | 1194 | 239 | 90.0 |
| Ce | 0 | 60.2 | 495 (0) | 122 | 337 | 260 | 1942 | 138 | 520 |
| Pr | 0 | 457 | 355 (0) | 485 | 920 | 226 | 259 | 286 | 610 |
| Nd | (64.0) | 133 (179) | 302 (359) | 319 () | 532 (1089) | 1222 (1220) | 29.4 (38.5) | 181 (175) | 39.6 (660) |
| Sm | 0 | 35.8 | 55.6 | 61.6 | 119 | 46.4 | 36.6 | 57.3 | 106 |
| Eu | 0 | 13.6 | 38.2 | 28.2 () | 77.4 | 22.0 | 72.4 | 26.9 | 10.7 |

Fig. 22

| RE1 \ RE2 | Gd | Tb | Dy | Y | Ho | Er | Tm | Yb | Lu |
|---|---|---|---|---|---|---|---|---|---|
| La | 0 | 12.2 | 43.6 () | 30.7 | 41.8 | 18.5 | 29.5 | 18.7 | 5.40 |
| Ce | 0 | 17.7 | 71.8 () | 17.9 | 26.7 | 14.1 | 142 | 27.1 | 17.8 |
| Pr | 0 | 65.4 | 46.1 () | 33.1 | 36.8 | 24.2 | 30.1 | 10.8 | 10.5 |
| Nd | (37.7) | 20.2 (26.2) | 12.0 (15.4) | 15.8 0 | 11.8 (24.7) | 13.2 (17.9) | 12.0 (18.7) | 7.26 (10.1) | 2.08 (27.3) |
| Sm | 0 | 3.05 | 2.94 | 2.79 | 3.32 | 2.98 | 2.98 | 1.50 | 1.85 |
| Eu | 0 | 1.51 | 1.78 | 1.55 0 | 1.61 | 1.24 | 1.23 | 1.48 | 0.150 |

Fig. 23A

| RE1 \ RE2 | Gd | Tb | Dy | Y | Ho | Er | Tm | Yb | Lu |
|---|---|---|---|---|---|---|---|---|---|
| La | 0 | 7.46 | 4.18 () | 11.1 | 20.0 | 9.52 | 40.5 | 12.8 | 16.8 |
| Ce | 0 | 3.40 | 6.90 () | 6.85 | 12.6 | 18.5 | 13.7 | 5.10 | 29.2 |
| Pr | 0 | 6.99 | 7.69 () | 14.7 | 25.0 | 9.35 | 8.62 | 26.5 | 58.1 |
| Nd | (1.70) | 6.58 (6.84) | 25.1 (23.2) | 20.2 () | 45.0 (44.2) | 92.6 (68.0) | 2.45 (2.05) | 24.9 (17.2) | 19.0 (24.2) |
| Sm | 0 | 11.8 | 18.9 | 22.1 | 35.8 | 15.6 | 12.3 | 38.2 | 57.5 |
| Eu | 0 | 9.01 | 21.5 | 18.3 () | 48.1 | 17.7 | 58.8 | 18.1 | 70.9 |

Fig. 23B

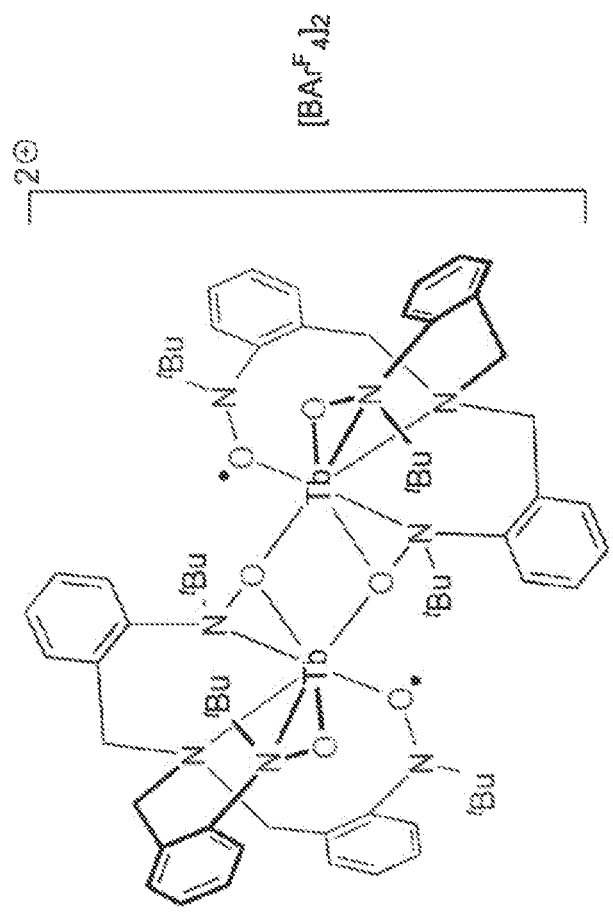
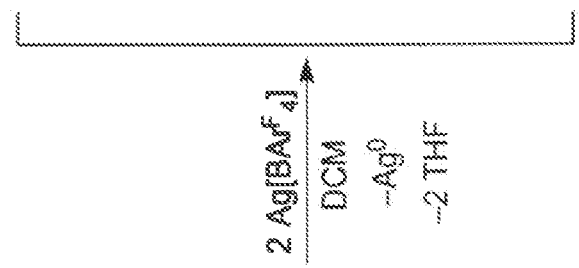
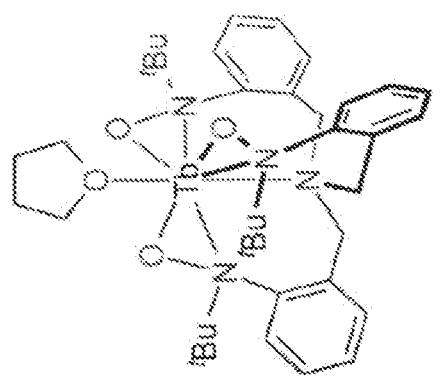
Fig. 25

SIMPLE CHEMICAL METHOD FOR THE SEPARATION OF RARE EARTH METALS

RELATED APPLICATIONS

This application is a 371 of International Application No. PCT/US2015/042703, filed Jul. 29, 2015, which claims the benefit of priority of U.S. Provisional Application No. 62/030,227, filed on Jul. 29, 2014, the disclosure of each of the aforesaid applications is incorporated by reference in the present application.

GOVERNMENT LICENSE RIGHTS

This invention was made with government support under grant number DE-SC0006518 awarded by the Department of Energy. The government has certain rights in the invention.

FIELD OF THE INVENTION

The present invention relates generally to methods for separating distinct rare earth metals: La—Lu, Sc and Y, in cationic form, from a mixture of rare earth metals and more particularly, but not exclusively, to methods for separating, one from the other, rare earth metals combined in a mixture of rare earth metals based, in part, on the varying ionic radii of the different component rare earth metals of the mixture.

BACKGROUND OF THE INVENTION

Rare earth metals (e.g., La—Lu, Sc and Y) are critical components of technologies ranging from electric vehicles to personal electronics to advanced wind turbines. Globally, rare earth metals are produced primarily (nearly exclusively) by Chinese suppliers and their exports are controlled by the Chinese government through quotas. In the last 5 years, the Chinese government has consolidated its domestic production of rare earth metals and reduced exports resulting in global market instability. The instability has forced international suppliers to pursue (largely unsuccessfully) new sources for the elements. Recycling of rare earths from finished products is one possible new source; however, there is a shortage of simple chemical methods to enable recycling. Less than 1% of rare earths were recycled in 2011.

One of the most important uses of rare earth metals is in the manufacture of hard, permanent magnets. The most important and widely used rare earth magnet is neodymium iron boride: $Nd_2Fe_{14}B$ (neo). The neo magnets may also contain amounts of the element praseodymium. In the manufacture of neo magnets, variable amounts of the elements Dy and/or Tb (depending on need) are added to improve the performance of the material over a wider temperature range. Dysprosium is one of the scarcest and most valuable of the rare earth metals and, because of its use in high performance neo magnets, its price is predicted to rise by 2600% in the next 25 years. The recycling of Dy and Nd from hard magnets has been identified as a potential source for those elements in a recently published life cycle analysis.

A key chemical problem for magnet recycling is the purification (separation) of dissolved Nd from dissolved Dy from a solution concentrate, following the chemically simpler removal of Fe and B. Current separations technology for rare earth metals uses countercurrent liquid-liquid extraction. This process is scalable, but is inefficient and requires significant initial capital investment and continuing costs in solvents and extractants.

Accordingly, a need exists in the field for new extraction and purification techniques that allow for the recovery and recycling of rare earth metals.

SUMMARY OF THE INVENTION

The present invention meets the needs in the field by providing methods of separating and purifying rare earth metals. The object of this invention is to separate and purify rare earth metals, e.g., the more valuable Dy away from Nd, in mixtures containing such metals using a simple chemical process without the need for countercurrent liquid-liquid separations.

In one aspect the present invention provides a method for separating rare earth metals (RE=La—Lu, Sc and Y), one from another, when combined in a source thereof, such as a permanent magnet, phosphor material, electronics component, battery, battery components or the like, as well as naturally occurring ore material.

In carrying out the method of the invention a chemical equilibrium is established in a polar solvent between complexes of the metals sought to be separated, with each complex comprising a rare earth metal ion and a ligand capable of binding to the metal ion. The complexes in equilibrium include a monomer comprising a metal ion having a relatively smaller ionic radius and a dimer comprising a metal ion having a relatively larger ionic radius, when the ionic radii of the two metal ions are compared.

The complexes between the metal ions and ligands form a molecular aperture that limits the exposure of the complexed metal ion to its environment. The size of the aperture and associated exposure is dictated by the ligand shape and its chemical functional groups and the relative sizes of the complexed ions. The relative size of the aperture dictates the position of the monomer-dimer equilibrium for a given ion. The position of the equilibrium for each ion dictates the selectivity for their separations. The size of the formed aperture may be quantified by measuring the % buried volume of the metal ion of interest in a metal ion-ligand monomeric complex as described herein.

The polar solvent is next replaced or diluted with a non-polar solvent, thereby resulting in a solid-liquid mixture. Although metal-ligand complexation occurs in the polar solvent, the addition or replacement with non-polar solvent shifts the chemical equilibrium and drives the formation of a monomeric metal-ligand complex (i.e., the solid fraction) and a dimeric metal-ligand complex (i.e., the liquid fraction). The solid component of the mixture comprises predominantly the metal having the smaller ionic radius, whose complex is in the monomeric form. And the liquid component of the mixture comprises predominantly the metal having the larger ionic radius whose complex is in the dimeric form. The selectivity of the system is expressed upon exposure to the non-polar solvent because the two forms of the system, monomer and dimer, exhibit vastly different solubilities.

The solid component is then separated from the liquid component. The separated metals, e.g., Dy and Nd, may thereafter be recovered from the solid and liquid components, respectively.

Furthermore, certain resulting complexes formed during the methods of the invention, such as monomeric complexes, may be electrochemically or chemically oxidized preferentially over other complexes (e.g., other monomeric complexes in a mixture) to provide, for example, dimeric complexes. Such chemical change is also expected to result in different solubility properties for the resulting dimers, which could be used as a basis for their separation using precipitation-filtration or liquid-liquid separation methods.

A method for recycling the ligand following separations of the metals is provided. Treatment of solutions of the metal-ligand complexes with oxalic acid followed by washing the resulting RE-oxalate salts with organic solvents enables reclamation of the ligand used in the separations process.

This invention may enable the recycling of various finished products, such as magnets, phosphor material, electronics component, battery, battery components or the like, because of the lower capital investment due to elimination of liquid-liquid separation from the process.

BRIEF DESCRIPTION OF THE DRAWINGS

The foregoing summary and the following detailed description of the exemplary embodiments of the present invention may be further understood when read in conjunction with the appended figures, in which:

FIG. 5 graphically illustrates the $^1$H-NMR spectrum of Tb[(2-($^t$BuNOH)CH$_2$—C$_6$H$_4$)$_3$N]THF in CD$_2$Cl$_2$.

FIG. 16 schematically illustrates an exemplary separation process for Nd and Dy rare earth metals in a 50:50 mixture and a bar graph demonstrating the enrichment of selected rare earth metals at each separation cycle.

FIG. 18 schematically illustrates two methods for synthesizing monomeric rare earth metal-ligand complexes (1-RE) from RE[N(SiMe$_3$)$_3$]$_3$ and H$_3$TriNOx (Method A) or from RE(OTf)$_3$, H$_3$TriNOx, and K[N(SiMe$_3$)$_2$] (Method B).

FIG. 19 is a table that includes the structural metrics relative percent buried volume (% V$_{bur}$) and self-association equilibrium constant (K$_{eq}$) of dimerization for the series of rare earth metal complexes.

FIG. 22 is a table that lists the separation factors, S$_{RE1/RE2}$, for the series of RE$_1$/RE$_2$ separations. Values in parentheses are from ICP-OES data.

FIGS. 23A and 23B provide tables that describe the enrichment factors for various RE1/RE2 separations, where FIG. 23A provides the solid fraction enrichment factors, for RE2/RE1; and FIG. 23B provides filtrate fraction enrichment factors, for RE1/RE2. RE2 refers to the later RE metal, and RE1 refers to the earlier RE metal. Values in parentheses are from ICP-OES data.

FIG. 25 schematically illustrates the synthesis of [Tb(TriNOx)]$_2$[BAr$^F_4$]$_2$ (3-Tb).

DETAILED DESCRIPTION OF THE INVENTION

Figure 1:
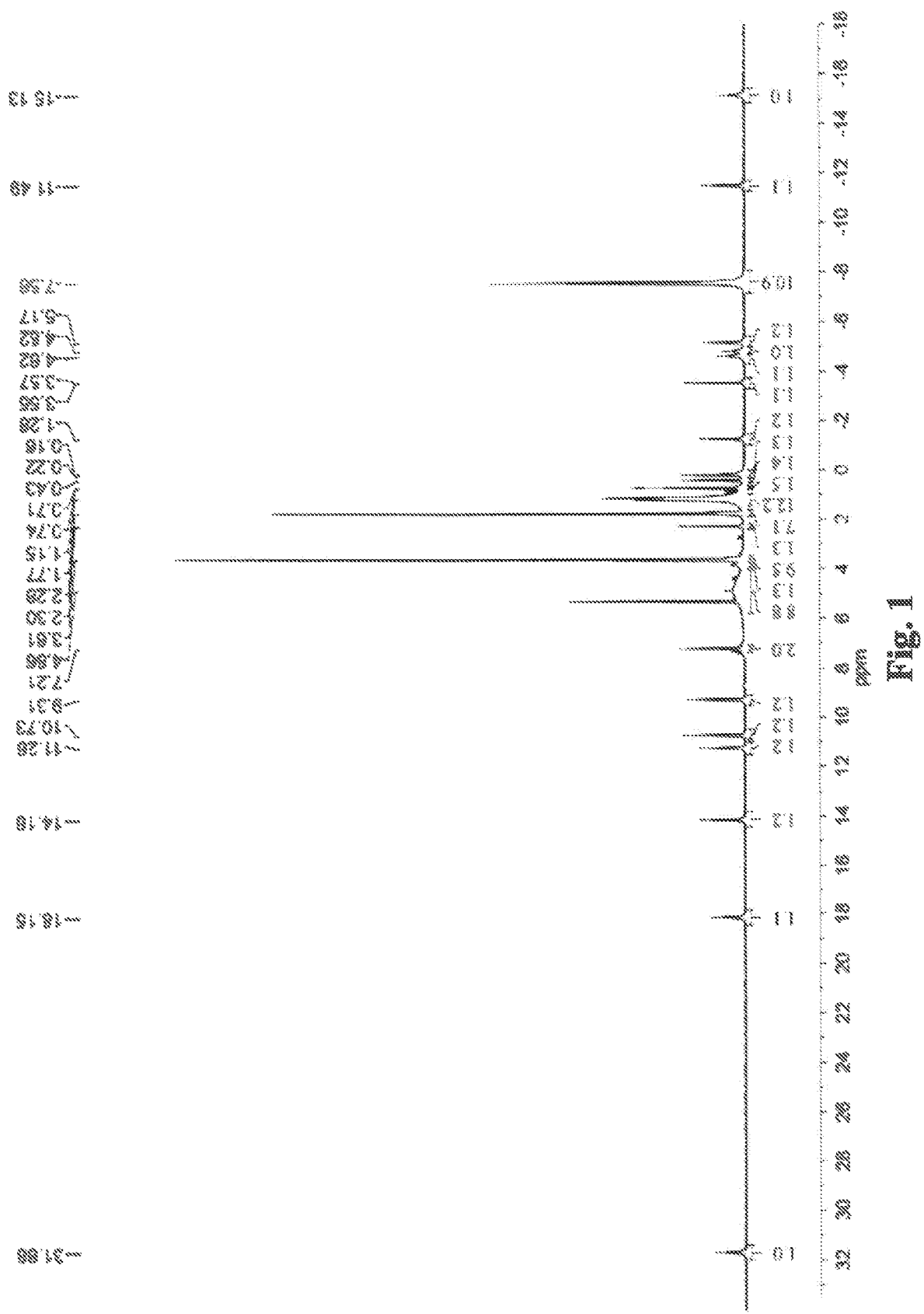
FIG. 1 graphically illustrates the $^1$H-NMR spectrum of Ce[(2-($^t$BuNOH)CH$_2$—C$_6$H$_4$)$_3$N]THF dissolved in CD$_2$Cl$_2$. THF=tetrahydrofuran.
Figure 2:
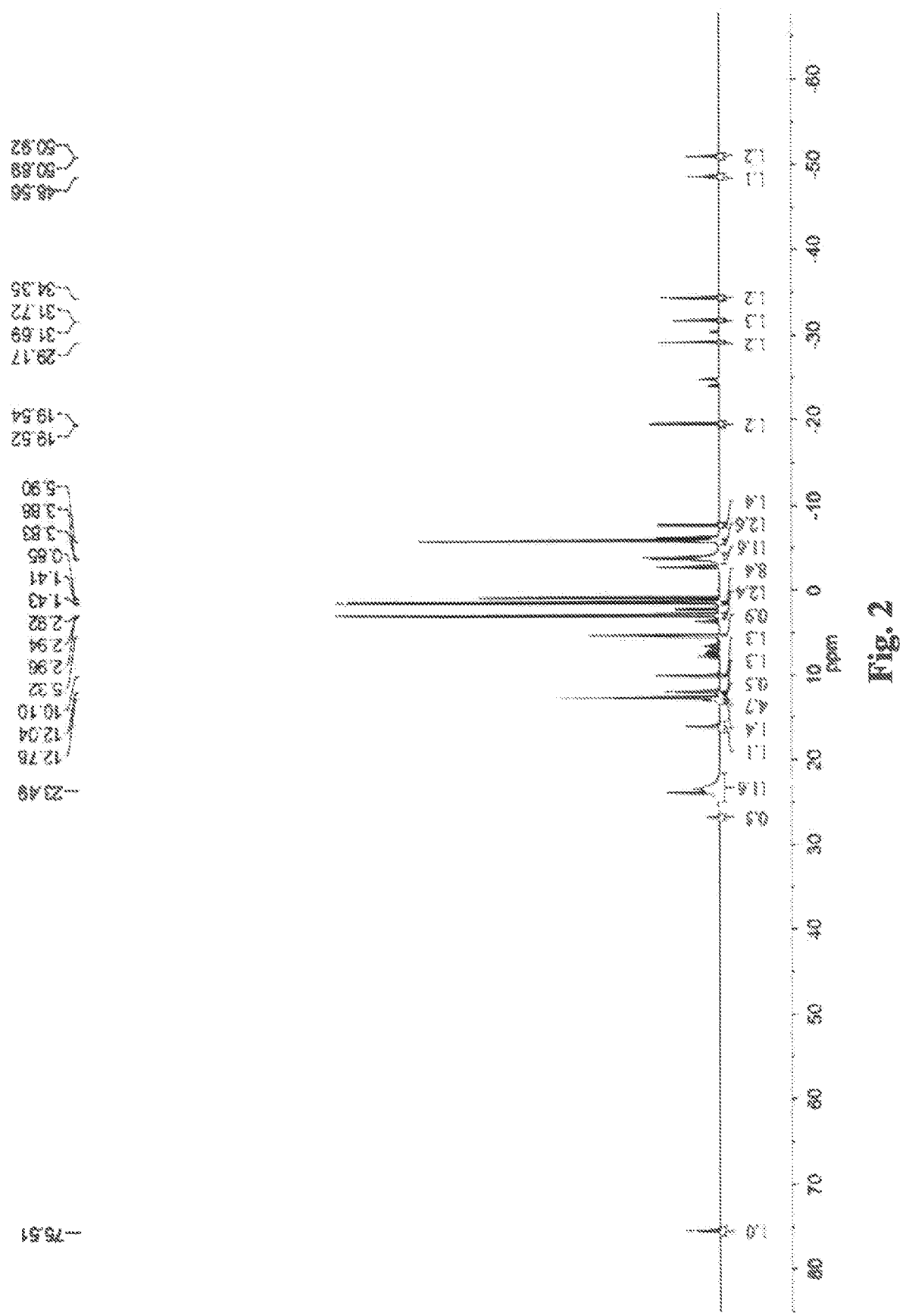
FIG. 2 graphically illustrates the $^1$H-NMR spectrum of Pr[(2-($^t$BuNOH)CH$_2$—C$_6$H$_4$)$_3$N]THF in CD$_2$Cl$_2$.
Figure 3:
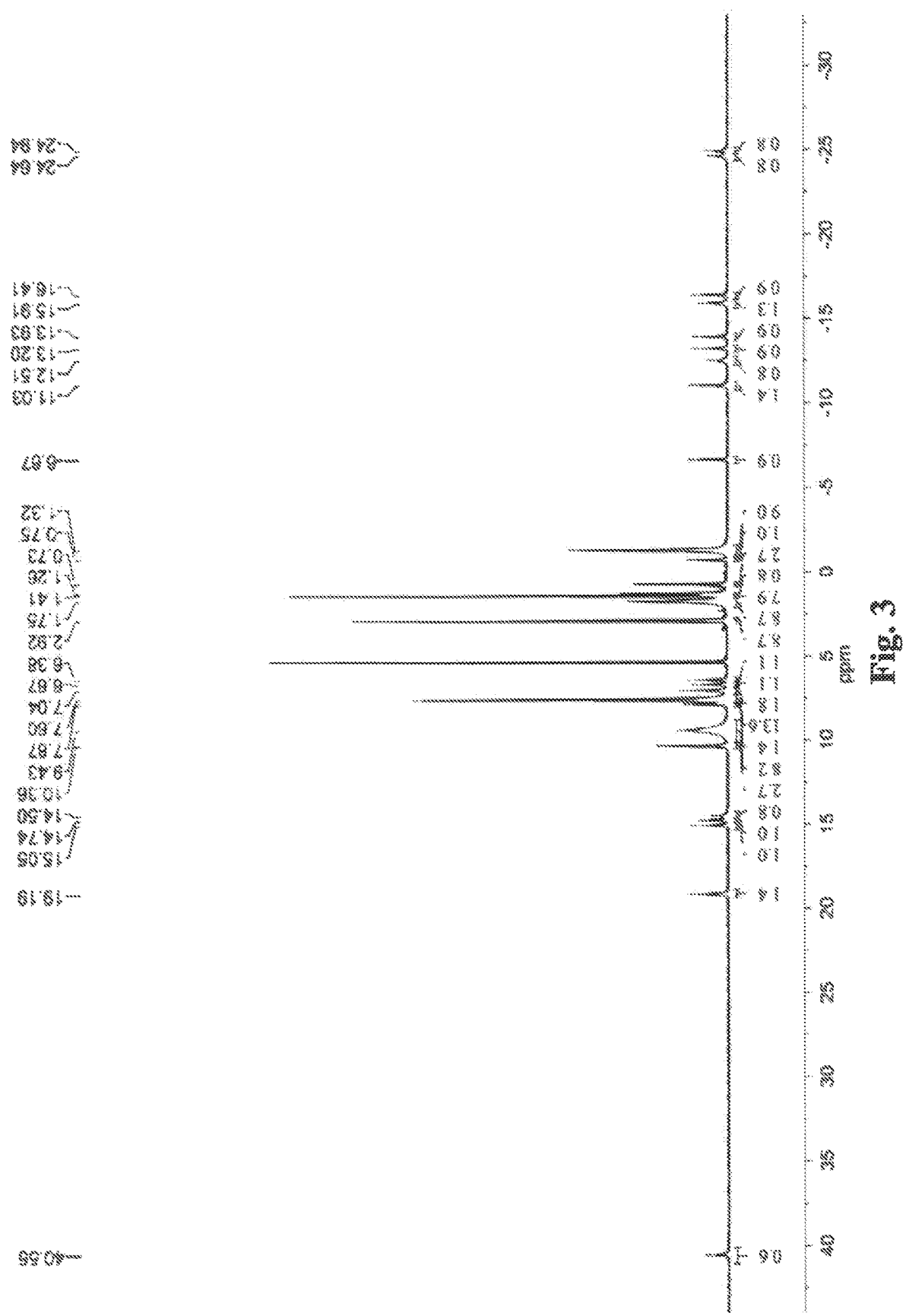
FIG. 3 graphically illustrates the $^1$H-NMR spectrum of Nd[(2-($^t$BuNOH)CH$_2$—C$_6$H$_4$)$_3$N]THF in CD$_2$Cl$_2$.
Figure 4A:
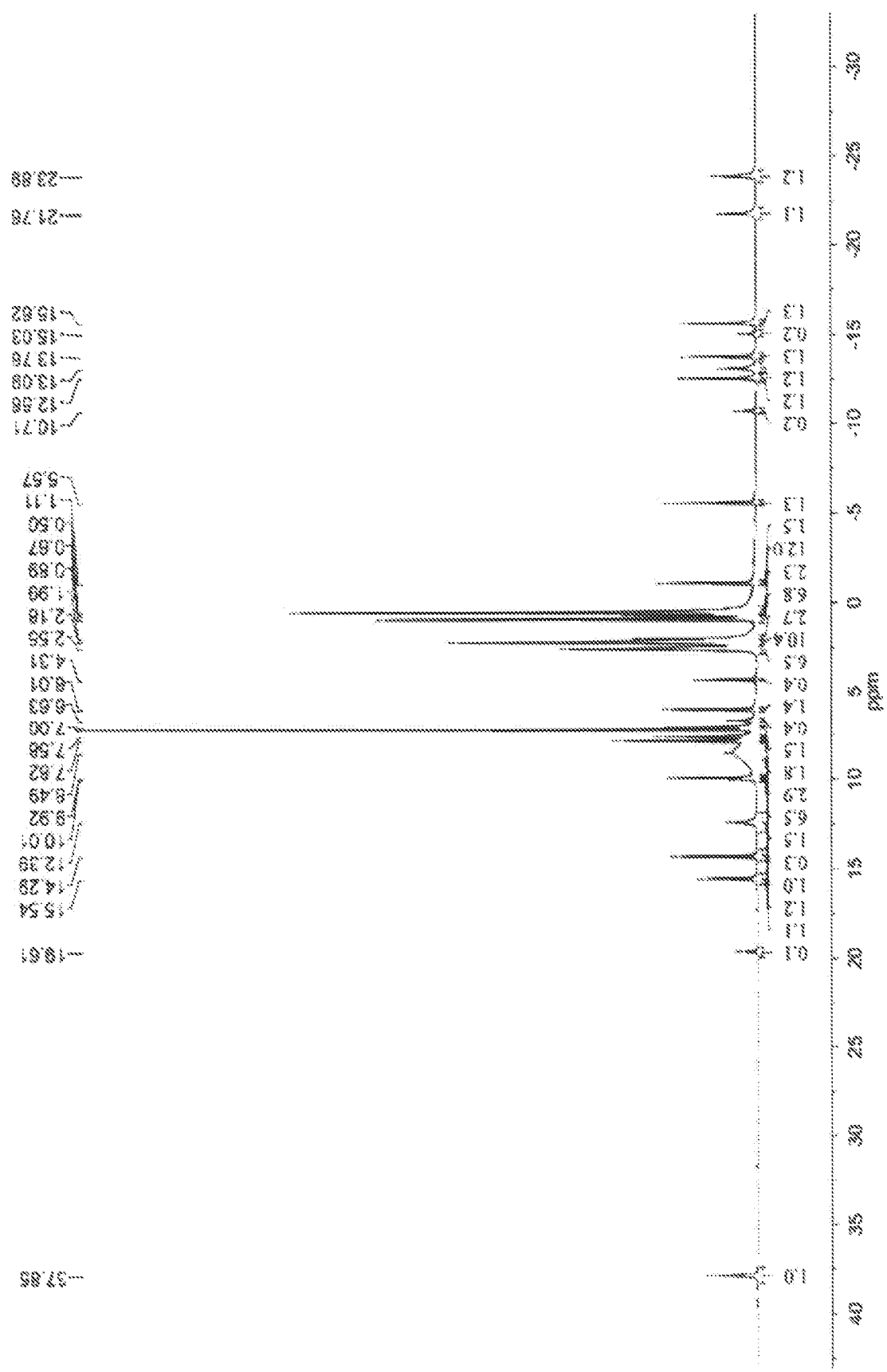
FIGS. 4A and 4B graphically illustrate the $^1$H-NMR spectrum of {Nd(2-($^t$BuNOH)CH$_2$—C$_6$H$_4$)$_3$N}$_2$ in C$_6$D$_6$ with 0 eq. THF added (FIG. 4A) and 10 eq. of THF added (FIG. 4B).
Figure 4B:
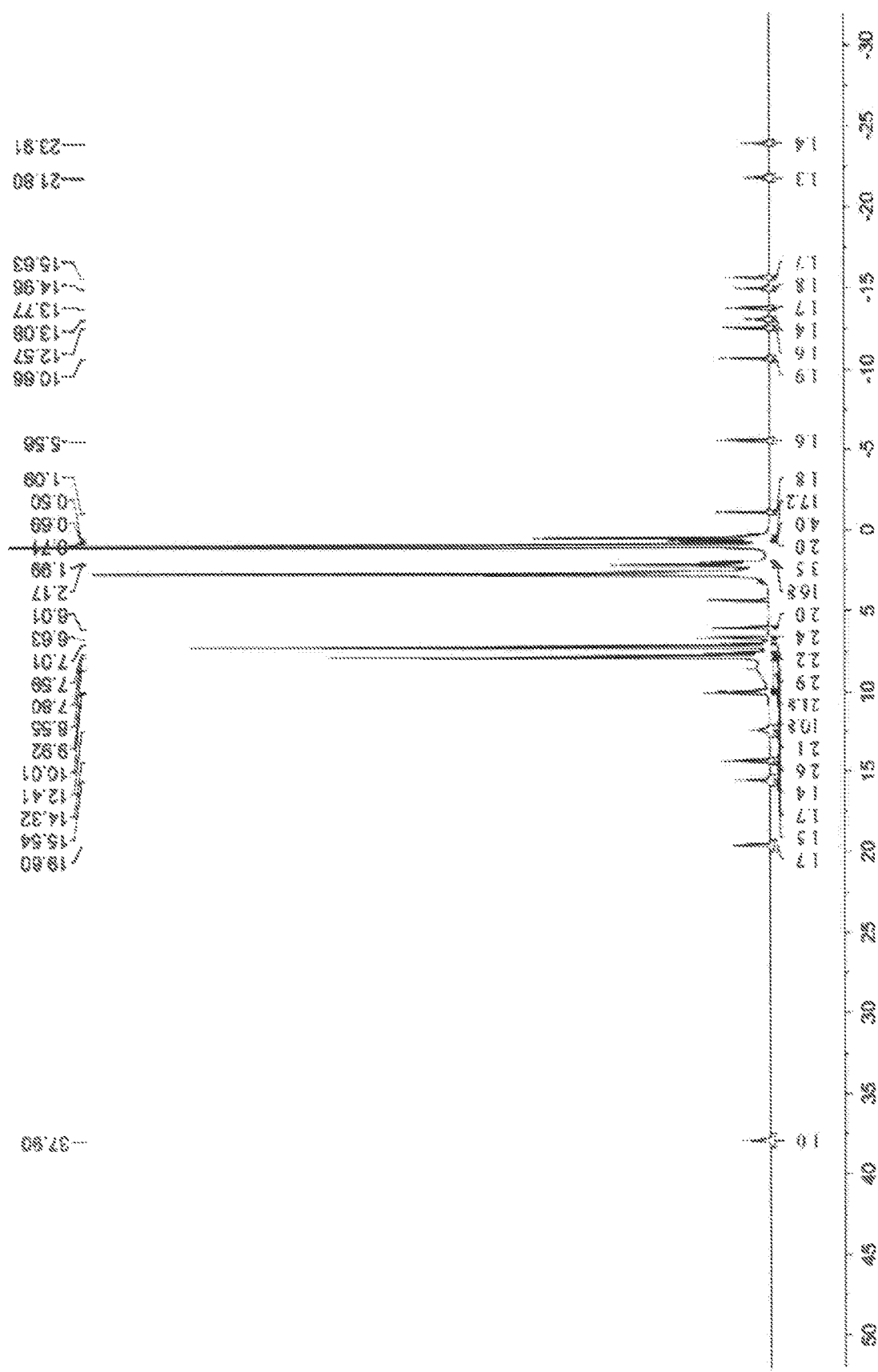
Figure 6:
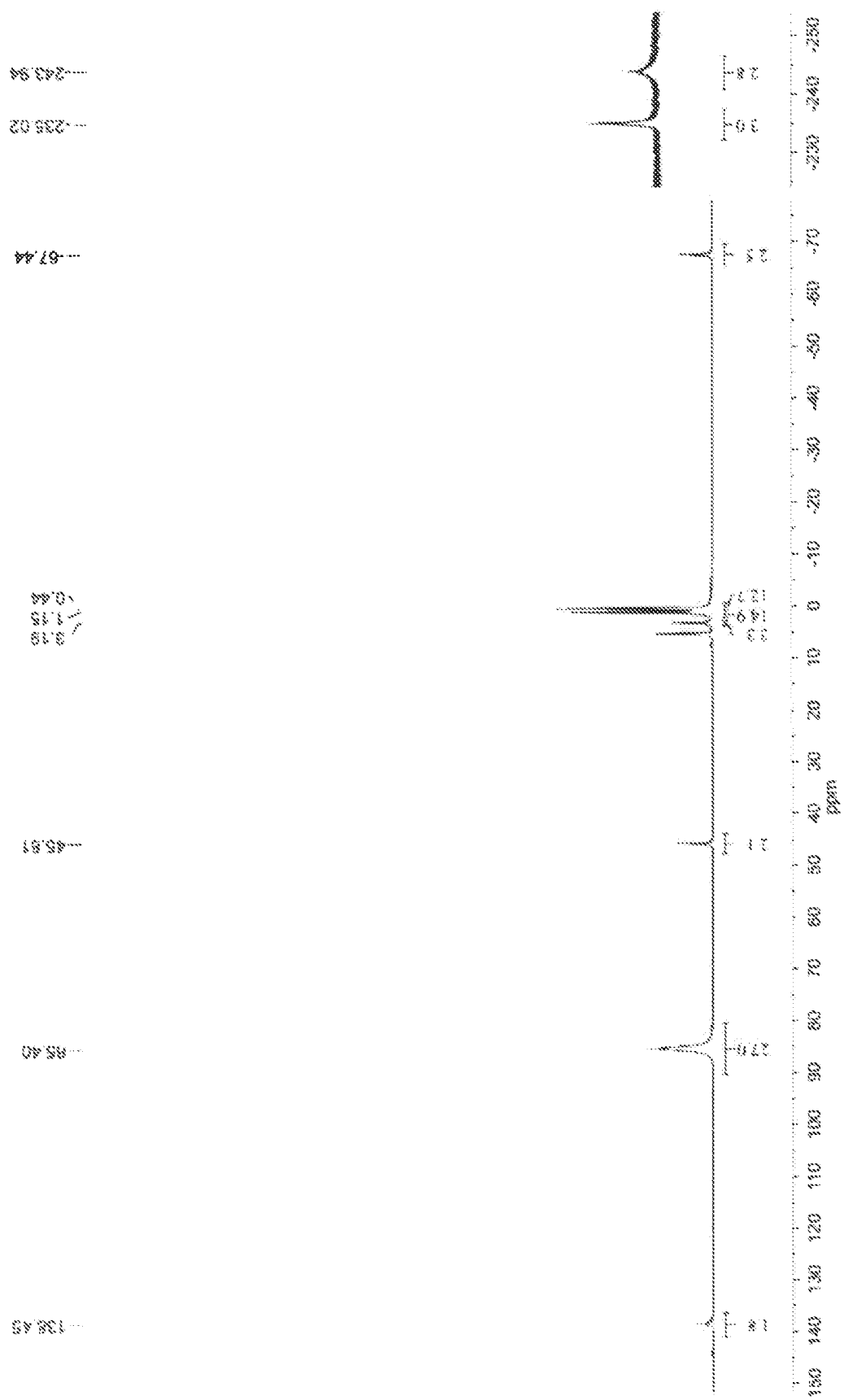
FIG. 6 graphically illustrates the $^1$H-NMR spectrum of Dy[(2-($^t$BuNOH)CH$_2$—C$_6$H$_4$)$_3$N]THF in CD$_2$Cl$_2$.
Figure 7:
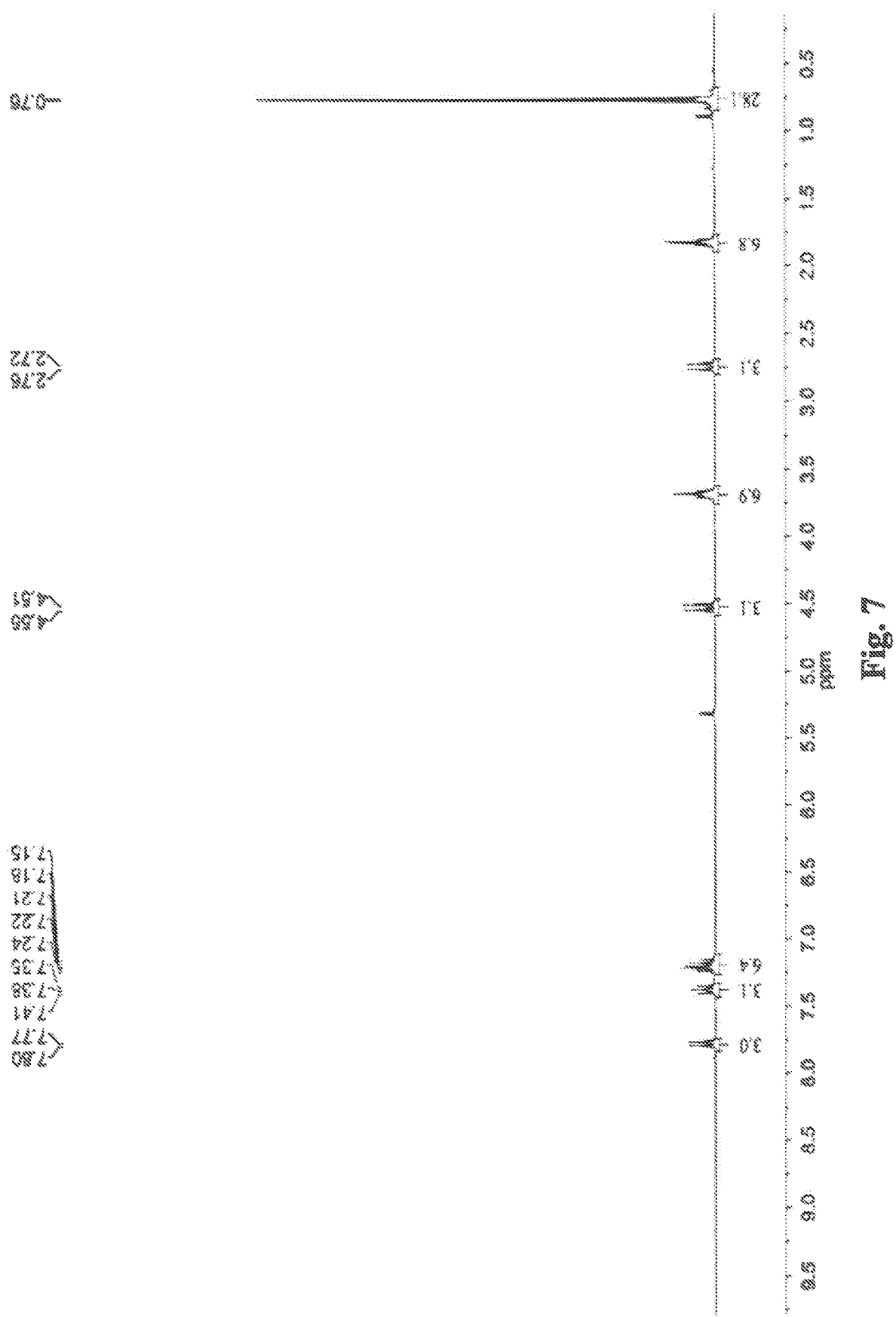
FIG. 7 graphically illustrates the $^1$H-NMR spectrum of Y[(2-($^t$BuNOH)CH$_2$—C$_6$H$_4$)$_3$N]THF in CD$_2$Cl$_2$.
Figure 8:
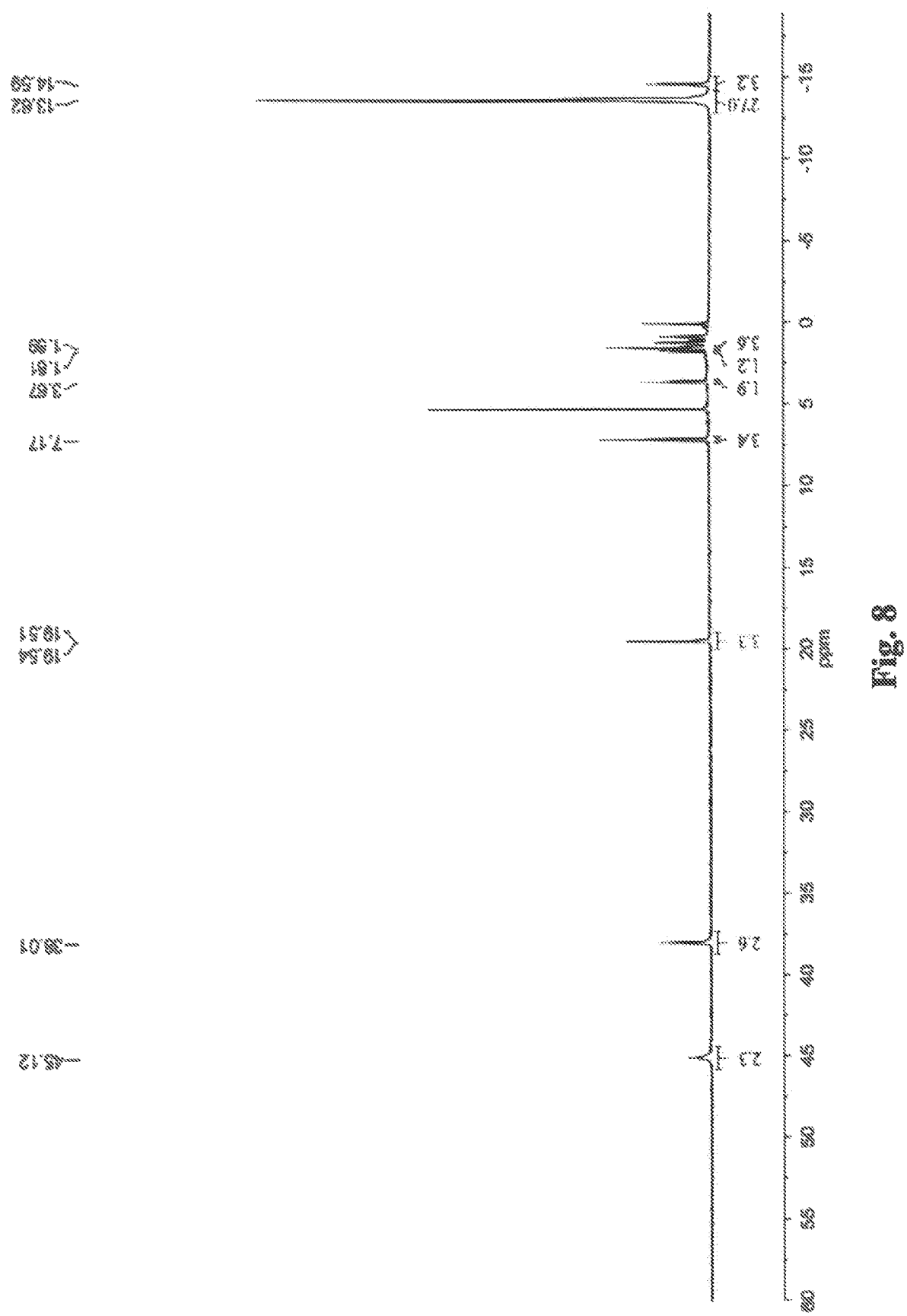
FIG. 8 graphically illustrates the $^1$H-NMR spectrum of Yb[(2-($^t$BuNOH)CH$_2$—C$_6$H$_4$)$_3$N] in CD$_2$Cl$_2$.

The present invention provides methods for separation, one from another, of rare earth metals that may be combined in a source or other mixture for the purpose of recycling those metals. As used herein, the term "rare earth metals" or "RE" may refer to Sc, Y, La, Ce, Pr, Nd, Pm, Sm, Eu, Gd, Tb, Dy, Ho, Er, Tm, Yb, and/or Lu. The term "early rare earth metals," as used herein, may include La, Ce, Pr, Nd, Pm, Sm, and Eu. The term "late rare earth metals," as used herein, may include Gd, Tb, Dy, Y, Ho, Er, Tm, Yb, and Lu.

The methods of the invention are provided for recycling devices and/or otherwise processing mixtures or concentrates that contain rare earth metals and thus serve as rare earth metal sources. For example, the sources of rare earth metals may include rare earth metal containing devices (e.g., magnets) and the scraps or waste generated in the production of such rare earth metal containing devices (e.g., magnet swarf). In addition, the sources of rare earth metals may include rare earth containing phosphor materials, such as electronic components, batteries or battery components, or any other device or device component wherein a rare earth metal containing material is used in the manufacture thereof. Alternatively, the rare earth metal source may include a naturally occurring rare earth metal ore that contains rare earth metals.

Turning to the steps of the invention, the methods may include establishing a chemical equilibrium in a polar solvent between complexes of the metals sought to be separated, where each complex may include a rare earth metal ion and a ligand capable of binding to the rare earth metal ion. The rare earth complexes create an aperture that limits the exposure of the complexed cation to the environment. The aperture of the ligands of the invention may be described in terms of the % buried volume (% $V_{bur}$) of the selected rare earth metal in a complex of the selected rare earth metal and the ligand.

The complexes formed according to the methods of the invention may include a monomer that includes a rare earth metal ion having a relatively smaller ionic radius (e.g., 1-RE) and a dimer formed on self-association of monomer complexes having a rare earth metal ion having a relatively larger ionic radius (e.g., 2-RE).

Exemplary ligands of the invention capable of binding rare earth metal ions may include those ligands described by Formula 1:

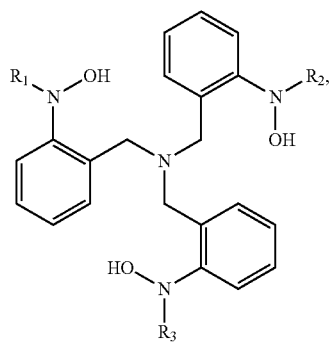

(1)

wherein $R_1$, $R_2$, and $R_3$ may be independently selected from the group consisting of alkyl, aryl, heteroaryl, and a heteroatom.

As used herein, the term "alkyl" denotes branched or unbranched hydrocarbon chains, having 1 to about 8 carbons, such as, methyl, ethyl, n-propyl, iso-propyl, n-butyl, sec-butyl, iso-butyl, tert-butyl, 2-methylpentyl, pentyl, hexyl, cyclohexyl, adamantyl, isohexyl, heptyl, 4,4-dimethyl pentyl, octyl, 2,2,4-trimethylpentyl and the like.

The term "aryl" as employed herein alone or as part of another group refers to monocyclic and polycyclic aromatic groups containing 6 to 10 carbons in the ring portion (such as phenyl or naphthyl including 1-naphthyl and 2-naphthyl) and may optionally include one to three additional rings fused to a carbocyclic ring or a heterocyclic ring, such as aryl, cycloalkyl, heteroaryl or cycloheteroalkyl rings or substituted forms thereof.

The term "heteroaryl" as used herein alone or as part of another group refers to a 5- or 7-membered aromatic ring which includes 1, 2, 3 or 4 hetero atoms such as nitrogen, oxygen or sulfur and such rings fused to an aryl, cycloalkyl, heteroaryl or heterocycloalkyl ring (e.g. benzothiophenyl, indolyl), and includes possible N-oxides The term "heteroatom" as used herein means an atom of any element other than carbon or hydrogen, such as, for example, nitrogen, sulfur, oxygen, and halide (e.g., F, Cl, Br, I).

In a preferred aspect of the invention, $R_1$, $R_2$, and $R_3$ are $^tBu$ in the ligand of Formula 1. Accordingly, a preferred ligand of the invention includes $H_3[(2-(^tBuNO)CH_2-C_6H_4)_3N]$. RE-ligand (e.g., a ligand of Formula 1) complexes formed according to the methods of the invention may be monomeric RE-ligand complexes (i.e., 1-RE) or dimeric RE-ligand complexes (i.e., 2-RE) (see Scheme 1, below). In certain embodiments, late rare earth metals generally form 1-RE complexes and early rare earth metals generally form 2-RE complexes.

The method of the invention may further include either a solvent-based separation process and/or an oxidative separation process.

With respect to the solvent-based separation process, the method may include the addition of a non-polar solvent and/or the replacement of the polar solvent with a non-polar solvent, which may result in a solid-liquid mixture. Although metal-ligand complexation occurs in the polar solvent, the addition or replacement with non-polar solvent shifts the chemical equilibrium and drives the formation of a monomeric metal-ligand complex (i.e., the solid fraction) and a dimeric metal-ligand complex (i.e., the liquid fraction). The solid component of the solid-liquid mixture may include predominantly the rare earth metal having the smaller ionic radius, and the liquid component of the mixture may include predominantly the rare earth metal having the larger ionic radius. The method may further include the step of separating the solid component from the liquid component to thereby recover the rare earth metal having the smaller ionic radius from the rare earth metal having the larger ionic radius.

The non-polar solvents of the invention may include, for example, benzene, toluene, xylene, hexane, pentane, ether, fluorobenzene, chlorobenzene and the like or a combination thereof. In certain aspects, the non-polar solvent of the invention is benzene or toluene. The polar solvents of the invention are preferably polar aprotic solvents. In certain aspects, the polar solvents of the invention may include, for example, dichloromethane, N,N-dimethylformamide (DMF), acetonitrile, tetrahydrofuran (THF) and the like or combination thereof.

With respect to the electrochemical separation process, the method may include applying an oxidizing electrochemical potential or a chemical oxidizing agent to the complexes of the rare earth metals sought to be separated, dissolved in a polar solvent, to selectively oxidize an earlier RE metal containing complex of a mixture (e.g., oxidizing a mixture of a late RE/late RE mixture of complexes where one of the late RE metals is an earlier late RE metal). The method may further include separating the oxidized, earlier RE metal complex through differences in solubility or chemical properties using precipitation-filtration or liquid-liquid extraction.

For example, where an extraction process of the invention provides a mixture of first and second late RE metal-ligand complexes in the solid fraction, such mixture may be further separated by oxidizing one of the first and second late RE metal-ligand complexes to provide a dimer. Oxidation in this instance may be performed on the solid mixture through either (1) a selective electrochemical oxidation; or (2) a chemical oxidation using a 1- or 2-electron oxidizing agent. Indeed, regarding electrochemical oxidation methods, the mixture of first and second late RE metal-ligand complexes may be analyzed using cyclic voltammetry to determine the oxidation potentials of such complexes. Using CV data, electrochemical oxidation may then be used to selectively oxidize one of the first and second late RE metal-ligand complexes to provide a dimeric complex, which may be removed using the appropriate solvent (e.g., polar solvent).

Regarding exemplary aspects of the invention, the present invention includes a ligand system designed and synthesized by the present inventors ($H_3[(2\text{-}(^tBuNO)CH_2\text{—}C_6H_4)_3N]$, Scheme 1), a chemical equilibrium between $RE[(2\text{-}(^tBuNO)CH_2\text{—}C_6H_4)_3N]THF$ (monomer) and $\{RE(2\text{-}(^tBuNO)CH_2\text{—}C_6H_4)_3N]\}_2$ (dimer) was developed, based on both rare earth cation (e.g., RE) ionic radius and appropriate choice of solvent.

solid fraction or filtrate fraction, which may result from the method. As used herein, the term "enrichment factor" may refer to the purity of an individual RE in a resulting solid or filtrate fractions from the methods of the invention based on the proportion of each rare earth metal component of the solid or filtrate. For example, the method of the invention may practiced to provide, for a Dy/Nd separation, a solid phase having a 50:50 mixture of Dy/Nd, which may be Scheme 1. Equilibrium between monomeric $RE[2\text{-}(^tBuNO)CH_2\text{—}C_6H_4)_3N]$ complexes (i.e., 1-RE) and their dimeric $\{RE[2\text{-}(^tBuNO)CH_2\text{—}C_6H_4)_3N]\}_2$ analogs (i.e., 2-RE).

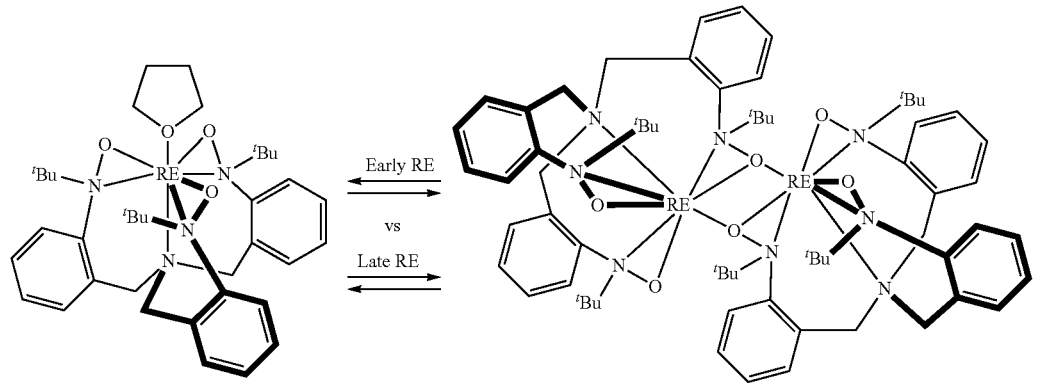

Specifically, the present invention demonstrates that early rare earth elements (e.g., La—Eu) may be separated from late ones (e.g., Gd—Lu) and Y, using a simple chemical method based on solubility differences, without the need for liquid-liquid extraction separations. The dimeric complexes showed relatively higher solubilities in non-polar solvents, as the ionic radius increased, while the monomeric complexes, favored for smaller rare earth ions, showed relatively lower solubilities in non-polar solvents (Scheme 1). Traversing the rare earth series elements from left to right in the periodic table, ionic radius decreases. FIGS. 1-8 provide evidence of complex formation.

The separation methods of the invention may be practiced on the basis of a separation factor ($S_{RE1/RE2}$) which defines the measure of separation between two rare earth metals (RE1 and RE2) present as a mixture or combination in a suitable source. As described herein, the processes of the invention may provide a resulting rare earth metal containing solid and a rare earth metal containing filtrate. Each of the rare earth containing solid and filtrate may include two rare earth metals to be separated (RE1 and RE2). In determining the separation factor, the user (1) determines the ratios of RE1 to RE2 for both the solid and filtrate to provide the solid RE1/RE2 ratio and filtrate RE1/RE2 ratio; then (2) divides the solid RE1/RE2 ratio and filtrate RE1/RE2 ratio to yield the separation factor ($S_{RE1/RE2}$) for the extraction process. The greater the separation factor, the more effective the separation for a given set of ions.

In certain aspects of the invention, the separation factor for the disclosed processes is greater than 5. In certain other aspects, the separation factor of the invention is greater than 10. Preferably, the separation factor of the invention is greater than 25. For example, in a particular separation of Nd and Dy according to the methods of the invention, the separation factor ($S_{Nd/Dy}$) may be about 359.

The efficiency of the methods of the invention may be further practiced on the basis of an enrichment factor of the washed with solvent to yield a solid product. The washed solid product may have a rare earth metal composition of 90% Dy and 10% Nd. In this example, the solid product may have a Dy enrichment factor of 9 (i.e., 0.9 Dy/0.1 Nd). In preferred aspects, the solid and/or filtrate fractions of the invention comprise a rare earth metal enrichment factor of at least about 9.

For example, in certain aspects of the invention, the methods described herein may be used to separate a single RE metal from a mixture of RE metals. Indeed, where a separation according to the invention provides a less than ideal separation factor, the separation may still be successful where either the solid fraction or filtrate fraction is highly enriched with a single RE metal. Thus, a successful separation according to the invention may encompass separating out a selected RE metal from a mixture of RE metals, where the separation provides a filtrate fraction having an enrichment factor of 9, but a solid fraction having an enrichment factor of less than 9 (e.g., 2).

Figure 9:
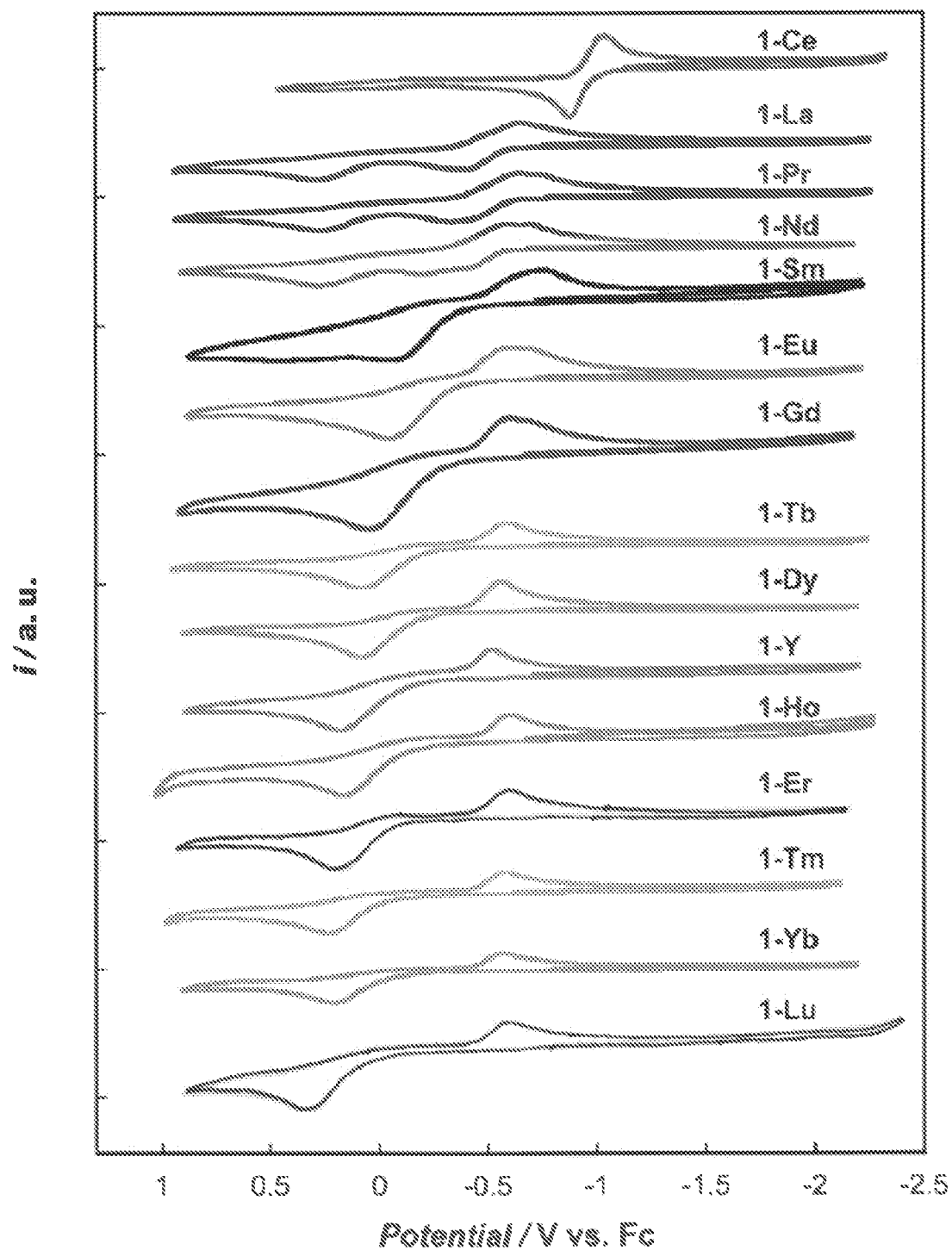
FIG. 9 graphically illustrates the cyclic voltammograms of the RE[(2-($^t$BuNOH)CH$_2$—C$_6$H$_4$)$_3$N]THF (1-RE) complexes in 0.1 M [$^n$Pr$_4$N][BAr$^F_4$] CH$_2$Cl$_2$ solutions illustrating the potential for electrochemical or oxidative chemical separations.
Figure 10B:
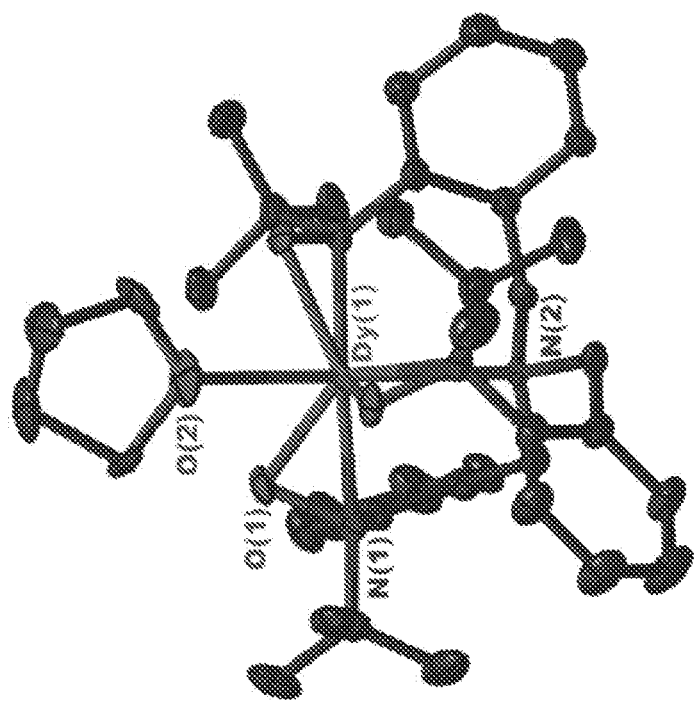
FIGS. 10A and 10B graphically illustrate X-ray crystallography data for {Nd[2-($^t$BuNOH)CH$_2$—C$_6$H$_4$)$_3$N]}$_2$ (FIG. 10A) and Dy[(2-($^t$BuNOH)CH$_2$—C$_6$H$_4$)$_3$N]THF (FIG. 10B).
Figure 10A:
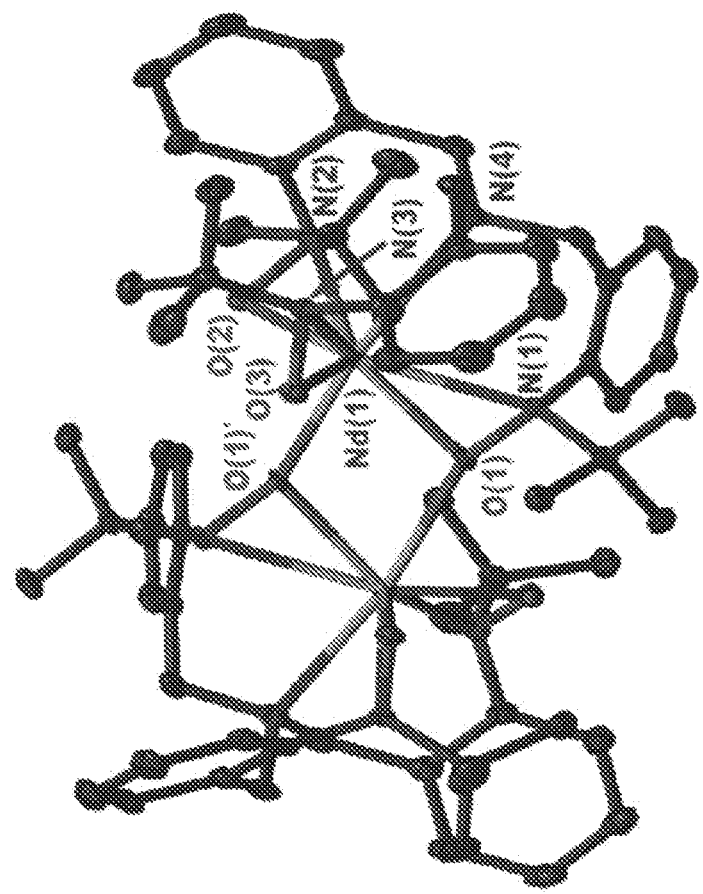

Referring to the RE-ligand complexes of the invention, the presence of dimer for the early rare earths utilized in the present invention was confirmed by both $^1$H-NMR spectroscopy and electrochemistry in solution phase (see FIG. 9) and X-ray crystallography in the solid state (see FIGS. 10A and 10B). Dimer was not observed for the late rare earths in any cases. Moreover, bound solvent (e.g., tetrahydrofuran (THF)) was observed to be easily removed for Yb. The dimeric $\{RE[(2\text{-}(^tBuNO)CH_2\text{—}C_6H_4)_3N]\}_2$ complexes had increased solubility in non-polar solvents over their monomeric analogs.

Rare earth metal coordination compounds of $[((2\text{-}^tBuNO)C_6H_4CH_2)_3N]^{3-}(TriNOx^{3-})$ may undergo a self-association (i.e., dimerization) equilibrium based on cation size. For example, due to the relatively larger value of its self-association equilibrium constant, the Nd-TriNOx system exhibits a fifty-fold higher solubility than the Dy-TriNOx system in benzene. Taken together, the solubility and self-association equilibria achieve a separation factor $S_{Nd/Dy}=359$ using simple solvent leaching, establishing the feasibility of the method fo the invention for targeted separations of consumer materials.

For example, to initiate the coordination chemistry-based separation described herein, a tripodal nitroxide ligand of formula 1, tris(2-tert-butylhydroxylaminato)benzylamine, ((2-$^t$BuNOH)C$_6$H$_4$CH$_2$)$_3$N (H$_3$TriNOx), was synthesized in 70% yield by a lithium halogen exchange reaction between the tris-2-bromobenzylamine and $^n$BuLi at −78° C., followed by the addition of 2-methyl-nitrosopropane dimer (FIG. 18). H$_3$TriNOx was air stable in both the solid and solution states. Isostructural RE(TriNOx)THF (e.g., RE=La, Nd, Dy, and Y), complexes of the invention were formed through a simple protonolysis route between H$_3$TriNOx and their respective RE$^{III}$[N(SiMe$_3$)$_2$]$_3$ reagents (FIG. 18, Method A). These resulting TriNOx complexes exhibited only low solubility in THF. The complexes of the invention could also be synthesized through an alternative, one pot synthetic route starting from the RE(OTf)$_3$ salts, 1 equiv, of H$_3$TriNOx, and 3 equiv. of K[N(SiMe$_3$)$_2$] in THF (FIG. 18, Method B). The structures of the RE (TriNOx)THF complexes revealed that each arm of the nitroxide ligand was coordinated $\eta^2$-(N,O) to the rare earth cations. This coordination mode provided a C$_3$-symmetric environment with an open site in the apical position, occupied by a THF molecule.

Analysis of the solution structures of RE(TriNOx)THF, wherein RE=La and Nd, in CD$_2$Cl$_2$, using $^1$H NMR spectroscopy revealed two dissolved species in each case, consistent with the RE(TriNOx)THF complexes and C$_2$-symmetric dimeric compounds. The identities of the dimeric compounds were confirmed by X-ray crystallography and the compounds were isolated in good yields by dissolving RE(TriNOx)THF, wherein RE=La and Nd, in toluene and stripping the solvent using reduced pressure. It is noteworthy that the [RE(TriNOx)]$_2$ compounds could be converted back into the respective RE(TriNOx)THF congeners by addition of THF to their benzene, toluene, or methylene chloride solutions. In the cases of RE=Dy or Y, dimers were not observed.

The existence of [RE(TriNOx)]$_2$ dimers in solutions of CH$_2$Cl$_2$ was also evident from solution electrochemistry experiments. La(TriNOx)THF and Nd(TriNOx)THF exhibited similar cyclic voltammograms that showed two overlapping, quasi-reversible ligand oxidation waves between 0 and −0.75 V versus Fc/Fc$^+$ followed by an irreversible oxidation feature at +0.4 V versus Fc/Fc$^+$. In contrast, the cyclic voltammograms of RE(TriNOx)THF, wherein RE=Y and Dy, showed one quasi-reversible oxidation, $E_{pa}$=+0.2 V, $E_{pc}$=−0.5 V versus ferrocene.

The value of the equilibrium constant for the dimerization of Nd(TriNOx)THF in benzene was determined using $^1$H NMR spectroscopy at room temperature. A solution of [Nd(TriNOx)]$_2$ in C$_6$D$_6$ was titrated with THF and the equilibrium concentrations of [Nd(TriNOx)]$_2$ and Nd(TriNOx)THF were measured at each titration point against an internal ferrocene standard. These data yielded a value of $K_{eq}$=2.4±0.2. Measurement of the equilibrium constant was also possible using a hypersensitive $^4I_{9/2}$→$^2G_{7/2}$, $^4G_{5/2}$ 4f-4f electronic transition for the Nd-TriNOx system. A spectrophotometric titration of Nd-dimer in benzene with THF revealed a clear isosbestic point at 594.1 nm and the data yielded an equilibrium constant of $K_{eq}$=2.9±0.4, in good agreement with the results from the NMR titration.

Without being limited to any one theory of the invention, the attenuated tendency for dimerization with decreasing ionic radius appeared to be due, in part, to an effective closing of the (N,O)$_3$ aperture formed by the three $\eta^2$-(N,O) arms of TriNOx$^{3-}$. To quantify the decrease in aperture size, we determined the percent buried volume (% $V_{bur}$) for Nd(TriNOx)THF and Dy(TriNOx)THF. As used herein, the term "percent buried volume" refers to a measurement of the volume of the primary coordination sphere of the rare earth metal cation that is blocked by the ligand, namely the ligand steric bulk, which blocks exposure of the cation to its environment. As described herein, the % $V_{bur}$ may be used as an aid to quantify the size of the aperture formed by the metal-ligand complex.

Upon changing the metal from Nd to Dy, for example, an increase in % $V_{bur}$ was calculated from 79.9% to 81.3%, respectively. This small, but significant, increase in % $V_{bur}$ and change in size of the (N,O)$_3$ molecular aperture is responsible for shifting the thermodynamic preference from dimer to monomer in the TriNOx system.

Moreover, the monomeric and dimeric complexes of the invention may have apertures that can be characterized based on their "monomeric % $V_{bur}$," which may be defined as the % $V_{bur}$ of a selected RE metal (either an early or late RE metal) in a monomeric complex of the selected RE metal and a ligand of the invention. In certain aspects of the invention the monomeric % $V_{bur}$ for a metal-ligand complex may be about 50% to about 100%. In another embodiment, the monomeric % $V_{bur}$ may be about 60% to about 95%. In a further embodiment, the monomeric % $B_{bur}$ may be about 70% to about 90%. In a preferred embodiment, the % $V_{bur}$ may be about 75% to about 85%.

The preferential formation of dimeric structures from the larger cations La and Nd with the TriNOx$^{3-}$ ligand and monomeric ones with the smaller Dy and Y can be exploited for targeted separations of Nd and Dy. To test for the formation of mixed metal dimers, which may interfere with a clean separation, $^1$H EXSY NMR spectroscopy experiments were performed on mixtures of Nd(TriNOx)THF and Dy(TriNOx)THF in CD$_2$Cl$_2$. No exchange was observed between Nd and Dy during these experiments. $^1$H EXSY NMR spectroscopy experiments were also performed on mixtures of Nd/Y(TriNOx)THF, a diamagnetic analog of the Dy(TriNOx)THF complex, to allow for longer EXSY experimental delay times; no cation exchange was observed in the Nd/Y experiments.

The absence of mixed-metal dimer formation prompted a search for conditions where the dimerization of Nd(TriNOx)THF could be exploited for solubility differences between the Nd and Dy species. Significantly different solubilities were observed for the Nd(TriNOx)THF and Dy(TriNOx)THF complexes in benzene. These solubilities were quantified by $^1$H NMR spectroscopy, where saturated C$_6$D$_6$ solutions of the complexes were prepared and measured against a ferrocene internal standard. The values of 60 mmol/L and 1.2 mmol/L determined for the Nd and Dy species, respectively, suggested that benzene could be used as an exemplary non-polar solvent to effectively separate these ions.

In a specific example, which is described in greater detail below, the method of the invention was used to purify Dy away from Nd using a 1:1 mixture for proof of concept, and obtained 95% pure Dy (see process description and data below). We also used the method to separate a 91:9 Nd/Dy mixture and obtained 89% pure Dy. A 91:9 Nd/Dy mixture corresponds to a magnet with ~3% Dy by total magnet weight. The elemental ratio found in high performance magnets (with ~9% Dy by total magnet weight) is ~3:1 Nd/Dy. We performed this 3:1 Nd/Dy separation as well and achieved 95% pure Dy. See Example 5 for a representative example procedure. Data characterizing the various rare earth-[(2-($^t$BuNO)CH$_2$—C$_6$H$_4$)$_3$N] complexes and descriptions of the separation methods are included below.

The following examples describe the invention in further detail. These examples are provided for illustrative purposes only, and should in no way be construed as limiting the scope of the invention.

Example 1

Synthesis of tris(2-tert-butylhydroxylaminato)benzylamine: H$_3$[(2-($^t$BuNO)CH$_2$—C$_6$H$_4$)$_3$N]

Solid tris-2-bromobenzylamine (3.0 g, 5.76 mmol, 1 equiv) was dissolved in THF (10 mL) and added to a 50 mL Schlenk flask equipped with a magnetic stir bar. The flask was placed under an N$_2$ atmosphere and cooled to −78° C. A 1.6 M solution of n-butyllithium complex in hexanes (11.8 mL, 19.0 mmol, 3.3 equiv) was added dropwise and the reaction was allowed to react for 3 hrs. A THF solution of 2-methyl-2-nitrosopropane dimer (1.99 g, 11.4 mmol, 2 equiv) was then added and the reaction was gradually warmed to room temperature overnight. The reaction was then quenched with a saturated aqueous ammonium chloride solution. The layers were separated and the aqueous layer was extracted by 3×50 mL dichloromethane. The extracts were collected and dried over magnesium sulfate. The drying agent was filtered off and volatiles were removed under reduced pressure, yielding crude H$_3$[(2-($^t$BuNO)CH$_2$—C$_6$H$_4$)$_3$N]. The crude mixture was purified by recrystallization in a boiling mixture of 90% petroleum ether and 10% dichloromethane, yielding pure H$_3$[(2-($^t$BuNO)CH$_2$—C$_6$H$_4$)$_3$N] in 78% yield (2.46 g)

Example 2

Synthesis of RE(((2-$^t$BuNOH)CH$_2$C$_6$H$_4$)$_3$N)THF complexes

Method A.

A hexane solution of RE[N(SiMe$_3$)$_2$]$_3$ (1 equiv) was layered onto a THF solution of H$_3$[(2-($^t$BuNO)CH$_2$—C$_6$H$_4$)$_3$ N] (0.26 g, 0.48 mmol, 1 equiv) and the reaction was allowed to sit undisturbed at room temperature for 48 hr. The resulting crystals were collected, washed with THF, and dried under reduced pressure yielding pure RE[(2-($^t$BuNO)CH$_2$—C$_6$H$_4$)$_3$N]THF in 70% yield.

Method B.

RE(OTf)$_3$ (1 equiv) was suspended in THF with vigorous stirring. A THF solution of H$_3$[(2-($^t$BuNO)CH$_2$—C$_6$H$_4$)$_3$N] (0.46 g, 0.85 mmol, 1 equiv) was then added, followed by solid K[N(SiMe$_3$)$_2$] (0.51 g, 2.54 mmol, 3 equiv). The reaction was allowed to stir at room temperature for 12 hrs. The resulting solid precipitate was rinsed thoroughly with THF and extracted with dichloromethane. Volatiles were removed under reduced pressure to yield crude RE[(2-($^t$BuNO)CH$_2$—C$_6$H$_4$)$_3$N]THF. The crude mixture was purified by layering THF onto a saturated solution of dichloromethane, yielding pure RE[(2-($^t$BuNO)CH$_2$—C$_6$H$_4$)$_3$N]THF in 50% yield.

Example 3

Figure 11C:
FIGS. 11A to 11C set forth pictures of before (FIG. 11A), during (FIG. 11B), and after (FIG. 11C) the Dy/Nd separations process on a 1:1 mixture.
Figure 11B:
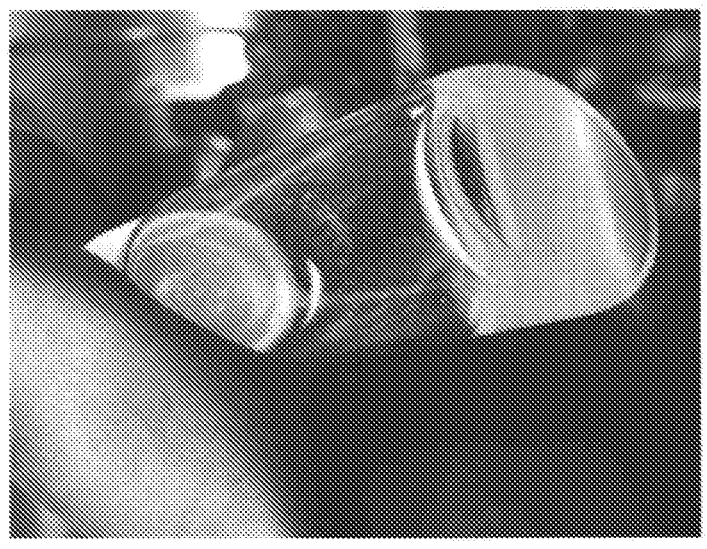
Figure 11A:
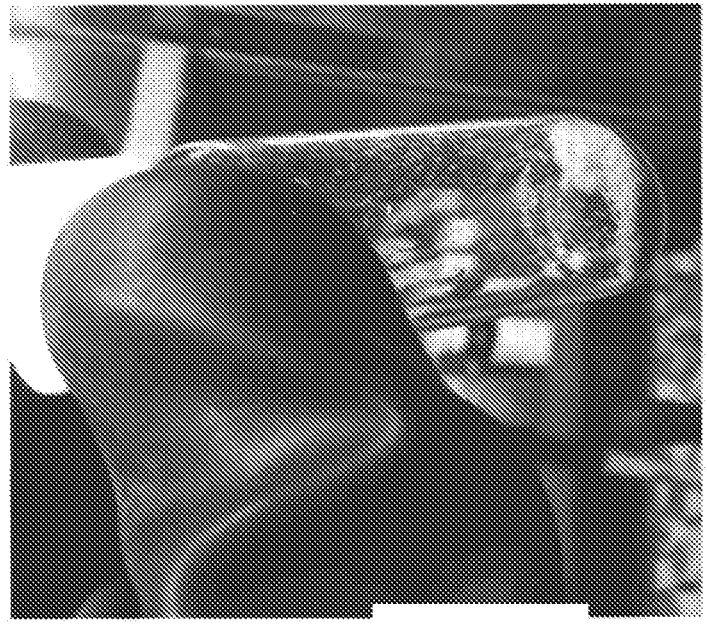
Figure 12:
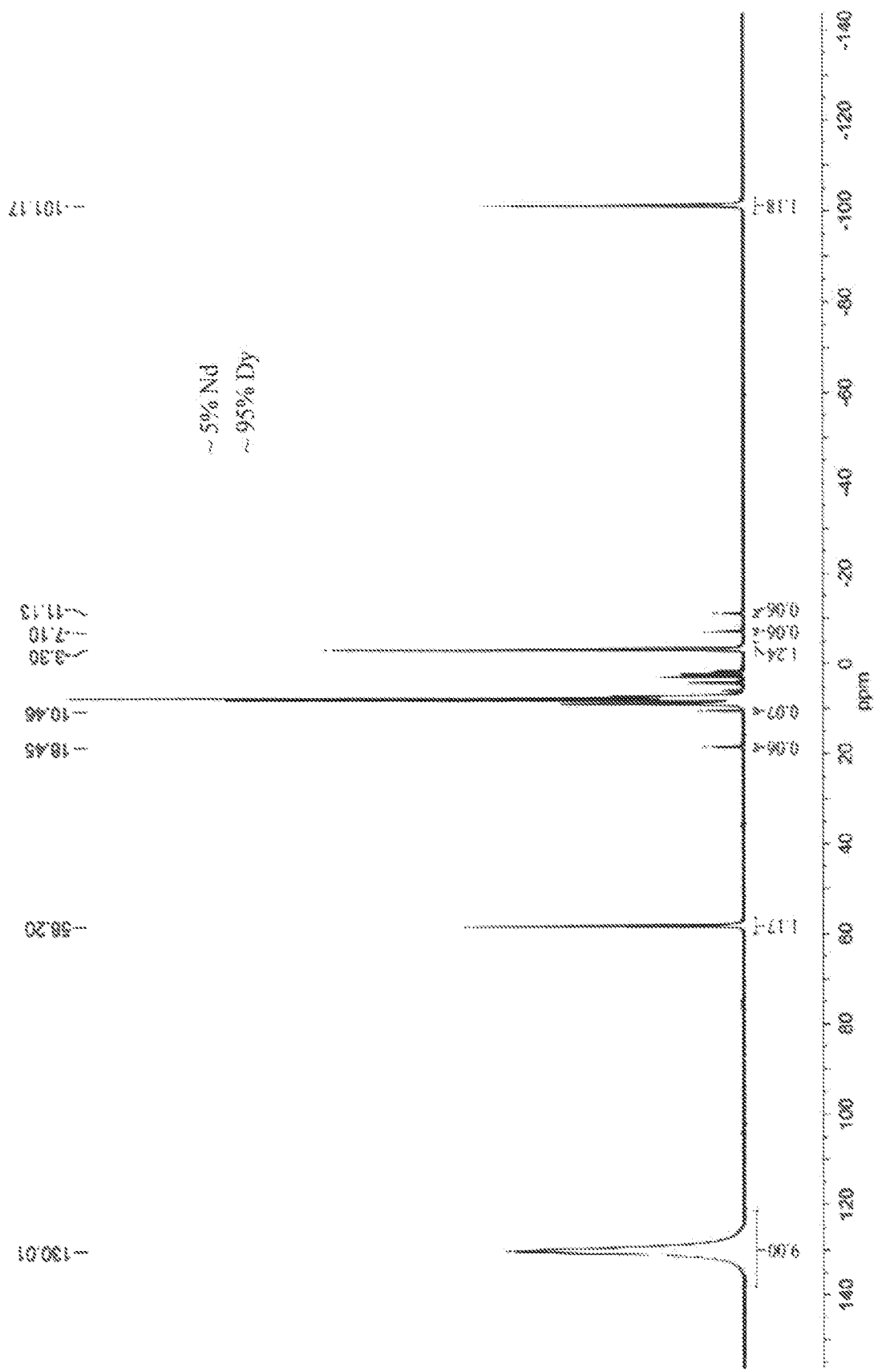
FIG. 12 graphically illustrates the $^1$H-NMR spectrum of Dy enriched solid phase following separation of a 50%/50% by metal mixture of {Nd[(2-($^t$BuNO)CH$_2$—C$_6$H$_4$)$_3$N]}$_2$/Dy[(2-($^t$BuNO)CH$_2$—C$_6$H$_4$)$_3$N]THF.
Figure 13:
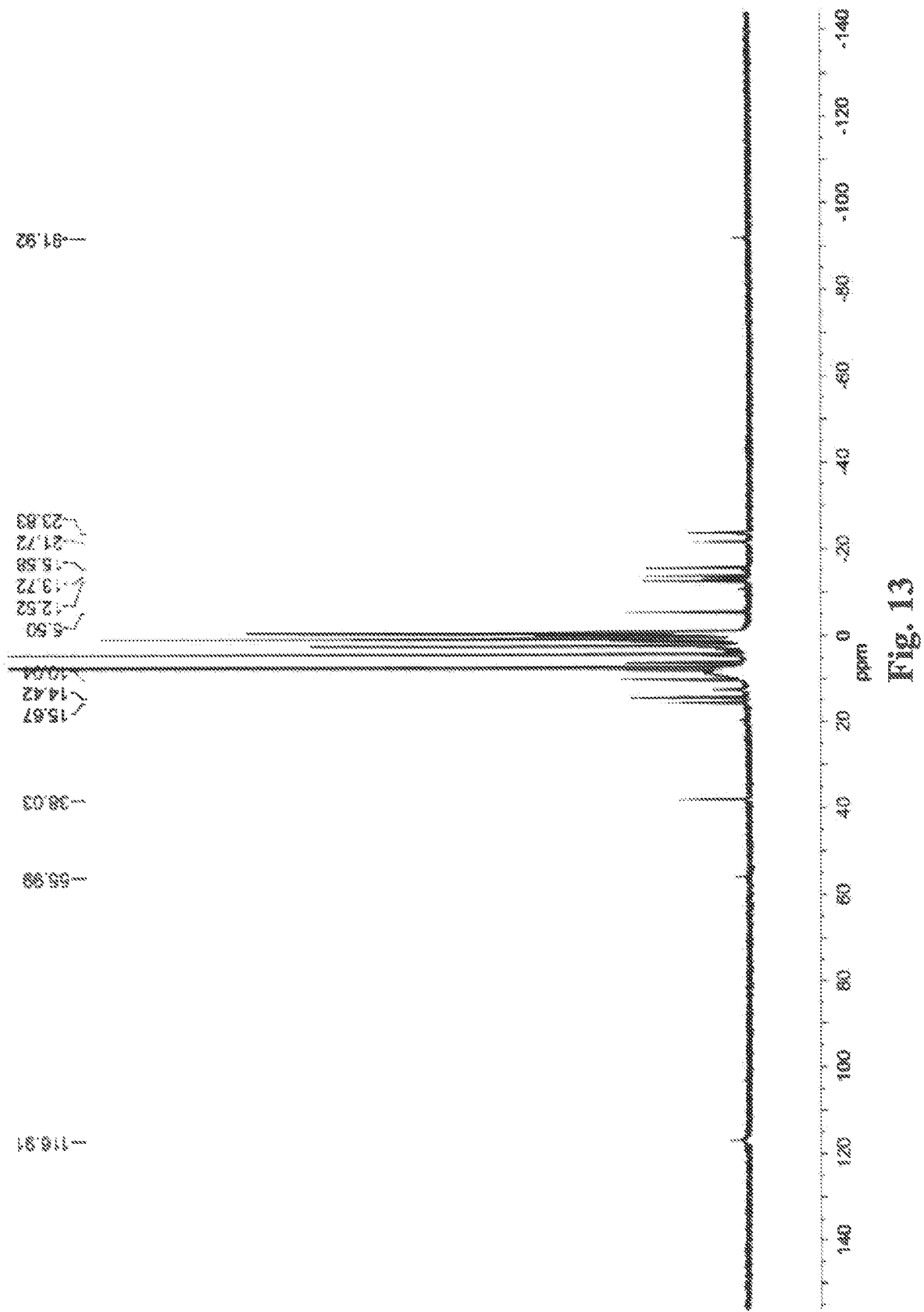
FIG. 13 graphically illustrates the $^1$H-NMR spectrum of Nd enriched solution phase following separation a 50%/50% by metal mixture of {Nd[(2-($^t$BuNO)CH$_2$—C$_6$H$_4$)$_3$N]}2/Dy[(2-($^t$BuNO)CH$_2$—C$_6$H$_4$)$_3$N]THF.

Separation of a 50%/50% by Metal Mixture of {Nd[(2-($^t$BuNO)CH$_2$—C$_6$H$_4$)$_3$N]}$_2$/Dy[(2-($^t$BuNO)CH$_2$—C$_6$H$_4$)$_3$N]THF Separately synthesized {Nd[(2-($^t$BuNO)CH$_2$—C$_6$H$_4$)$_3$N]}$_2$ (15 mg, 0.011 mmol, 1 equiv) and Dy[(2-($^t$BuNO)CH$_2$—C$_6$H$_4$)$_3$N]THF (17 mg, 0.022 mmol, 2 equiv) were both added to a 20 mL scintillation vial. These were dissolved in ~2 mL of dichloromethane to allow for the potential formation of a mixed {NdDy} dimer, which was not observed. Solvents were removed under reduced pressure and ~1 mL of benzene was added. In benzene, the dimer is favored for the larger Nd(III) cation and the {Nd[(2-($^t$BuNO)CH$_2$—C$_6$H$_4$)$_3$N]}$_2$ goes up into solution. For the smaller Dy(III) cation, on the other hand, the monomer is favored, which remains insoluble. The mixture was filtered, washed with 1 mL benzene, and both the blue filtrate and white solid were collected. Analysis of the filtrate and resulting solid revealed a Nd enriched solution phase and a Dy enriched solid phase. See FIGS. 11-13.

Example 4

Figure 14:
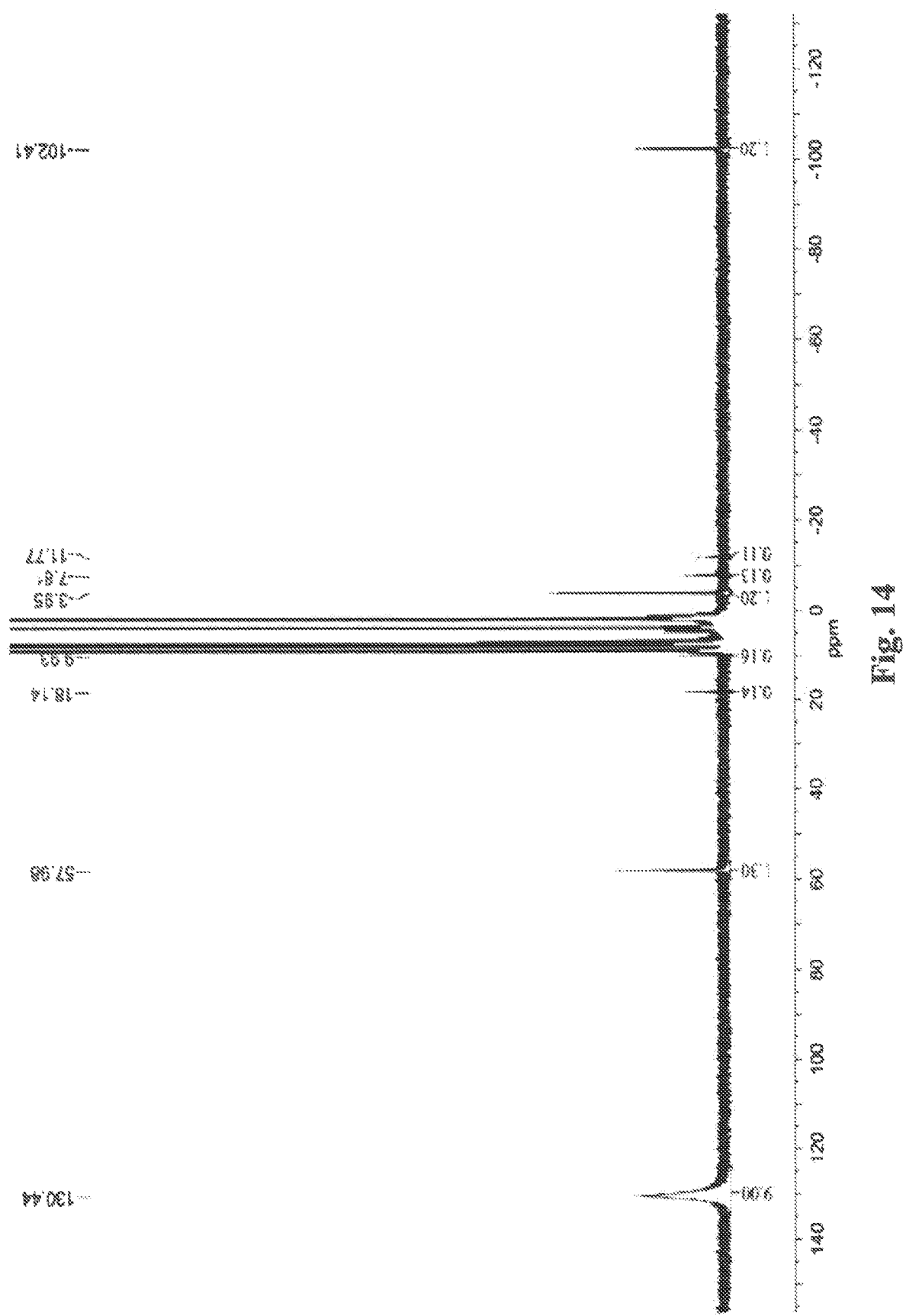
FIG. 14 graphically illustrates the $^1$H-NMR spectrum of Dy enriched solid phase following separation of a 91%/9% by metal mixture of {Nd[(2-($^t$BuNO)CH$_2$—C$_6$H$_4$)$_3$N]}2/Dy[(2-($^t$BuNO)CH$_2$—C$_6$H$_4$)$_3$N]THF.
Figure 15:
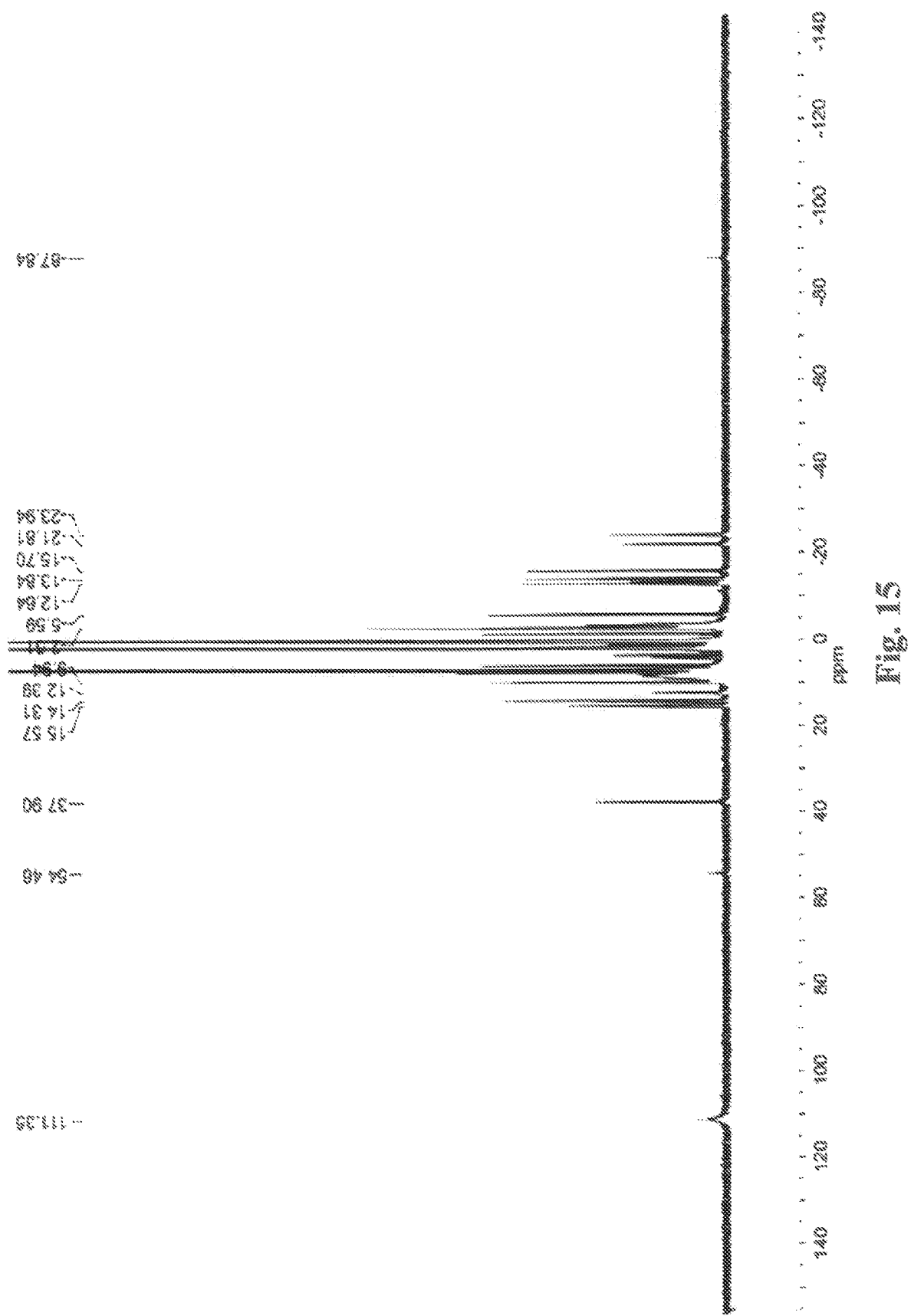
FIG. 15 graphically illustrates the $^1$H-NMR spectrum of Nd enriched solution phase following separation of a 91%/9% by metal mixture of {Nd[(2-($^t$BuNO)CH$_2$—C$_6$H$_4$)$_3$N]}$_2$/Dy[(2-($^t$BuNO)CH$_2$—C$_6$H$_4$)$_3$N]THF.

Separation of a 91%/9% by Metal Mixture of {Nd[(2-($^t$BuNO)CH$_2$—C$_6$H$_4$)$_3$N]}$_2$/Dy[(2-($^t$BuNO)CH$_2$—C$_6$H$_4$)$_3$N]THF Separately synthesized {Nd[(2-($^t$BuNO)CH$_2$—C$_6$H$_4$)$_3$N]}$_2$ (45 mg, 0.033 mmol, 1 equiv) and Dy[(2-($^t$BuNO)CH$_2$—C$_6$H$_4$)$_3$N]THF (5 mg, 0.006 mmol, 0.1978 equiv) were both added to a 20 mL scintillation vial. These were dissolved in ~2 mL of dichloromethane to allow for the potential formation of a mixed {NdDy} dimer, which was not observed. Solvents were removed under reduced pressure and ~3 mL of benzene was added. The mixture was filtered, washed with 3×1 mL benzene, and the blue filtrate was analyzed. The solid was then rinsed through the frit with d$_5$-pyr (saturated solution) and was analyzed. Analysis of the filtrate and solid revealed a Nd enriched filtrate and a Dy enriched solid. See FIGS. 14 and 15.

Example 5

Separation of a 75:25 Mole Ratio Mixture of Nd(TriNOx)THF to Dy(TriNOX)THF

A separation was also performed using Method B of Example 2 on a 75:25 mole ratio mixture of Nd(TriNOx)THF to Dy(TriNOx)THF, a ratio that is used in Nd$_2$Fe$_{14}$B high performance magnets. The filtrate phase was enriched to 97.6% Nd and the solid phase was enriched to 95.2% Dy as indicated by $^1$H NMR spectroscopic analysis. These results were comparable to those obtained from the 50:50 mixtures.

Example 6

Reclamation of TriNOX Ligand

Figure 17:
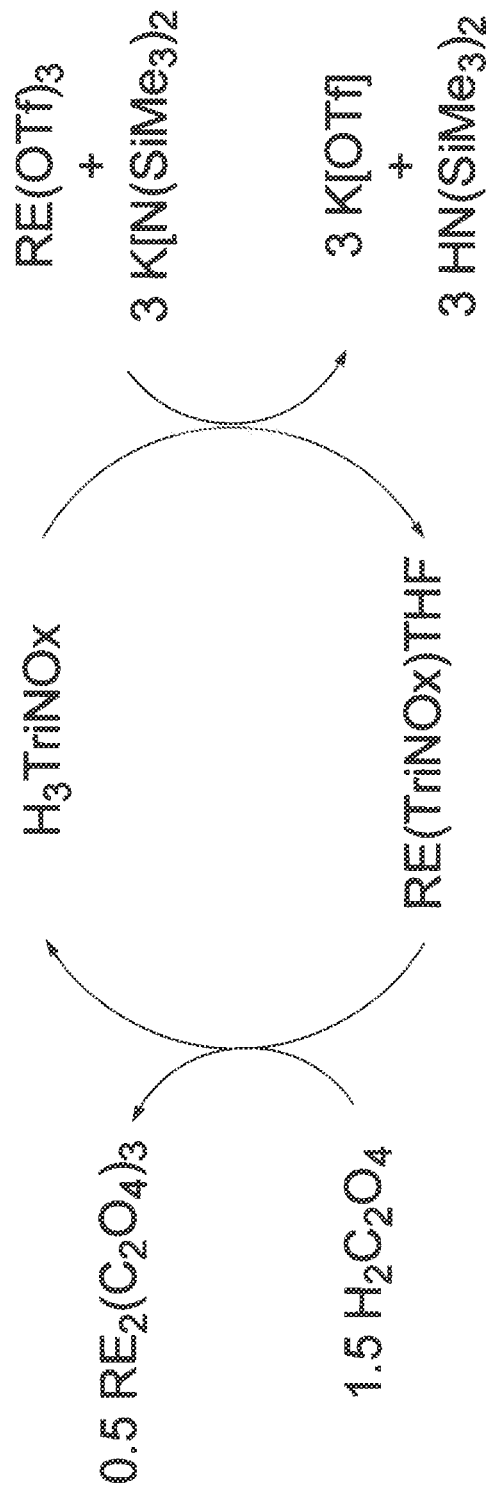
FIG. 17 schematically illustrates the recyclability of an exemplary ligand used in the methods of the invention.

Aqueous oxalic acid solutions (1.5 eq.) were added to pure samples of Nd(TriNOx)THF and Dy(TriNOx)THF in an effort to reclaim the TriNOx ligand. In both cases, pure H$_3$TriNOx was extracted using 3×50 mL of chloroform in 87% and 77% recoveries, respectively. Based on these results, a complete synthetic cycle was performed, starting from the addition of THF solutions of H$_3$TriNOx to mixtures of Nd/Dy(OTf)$_3$ salts and ending with the isolation of RE$_2$(C$_2$O$_4$)$_3$, wherein RE=Nd and Dy, with the recovery of H$_3$TriNOx (FIG. 17).

Example 7

Separation of Additional Rare Earth Metals Using Methods A and B from Example 2

The series of 1-RE complexes, RE=Pr, Sm—Tb, Ho—Lu, was synthesized using procedures provided for RE=La, Ce, Nd, Dy, and Y. Method A involved layering hexanes solutions of the Tris[N,N-bis(trimethylsilyl)amide] reagents, $RE[N(SiMe_3)_2]_3$, onto THF solutions of protonated $H_3TriNOx$ and isolating the X-ray quality crystals that formed. Method B involved reacting the rare earth triflate salts, $RE(OTf)_3$, with 1 equivalent of $H_3TriNOx$, and 3 equivalents of $K[N(SiMe_3)_2]$ in THF (FIG. 18). X-ray quality crystals of the crude 1-RE formed by this route were grown by layering THF onto saturated dichloromethane solutions. The low solubility of 1-RE, RE=Tm—Lu, in dichloromethane and THF/hexanes solutions, however, prevented the isolation of X-ray quality crystals using these methods. Thus, X-ray quality crystals of these complexes were formed by layering a pre-cooled THF solution of $K[N(SiMe_3)_2]$ onto a pre-cooled THF solution of $RE(OTf)_3$ and $H_3TriNOx$ and letting the reaction sit at $-25°$ C.

The structural metrics obtained from their solid-state structures indicated that the complexes were isostructural across the series. The $\eta^2$-(N,O) bonding mode of the three nitroxide arms was retained and each complex contained a single molecule of THF coordinated to the central metal cation. As shown in FIG. 19, there was a steady decrease in the metal-ligand bond lengths across the series, consistent with the decrease in ionic radii of the central metal cation. This resulted in a gradual closing of the molecular aperture formed by the three oxygen atoms of the $TriNOx^{3-}$ ligand as indicated by the gradual increase in percent buried volume (% $V_{bur}$) from 78.6 for La to 82.6 for Lu.

Detailed $^1$H NMR spectroscopy experiments were performed to gain insight into the solution chemistries of these complexes. Again, the $C_3$ symmetry of these complexes was maintained in $d_5$-pyridine. In $C_6D_6$ solutions, however, resonances for $C_2$ symmetric dimeric structures were observed in solutions of 1-RE, RE=La—Eu. These dimeric [RE(TriNOx)]$_2$ complexes (2-RE) could be isolated for RE=La—Sm by dissolving the respective 1-RE species in toluene and removing the solvent under reduced pressure. X-ray quality crystals of 2-RE, RE=La—Sm, were grown by layering hexanes onto saturated dichloromethane or toluene solutions of their respective 1-RE complexes or cooling saturated $Et_2O$ solutions of 1-RE to $-25°$ C. The presence of only minimal amounts of dimer in solutions of the 1-Eu species prevented the isolation and crystallization of the putative 2-Eu species.

Figure 20:
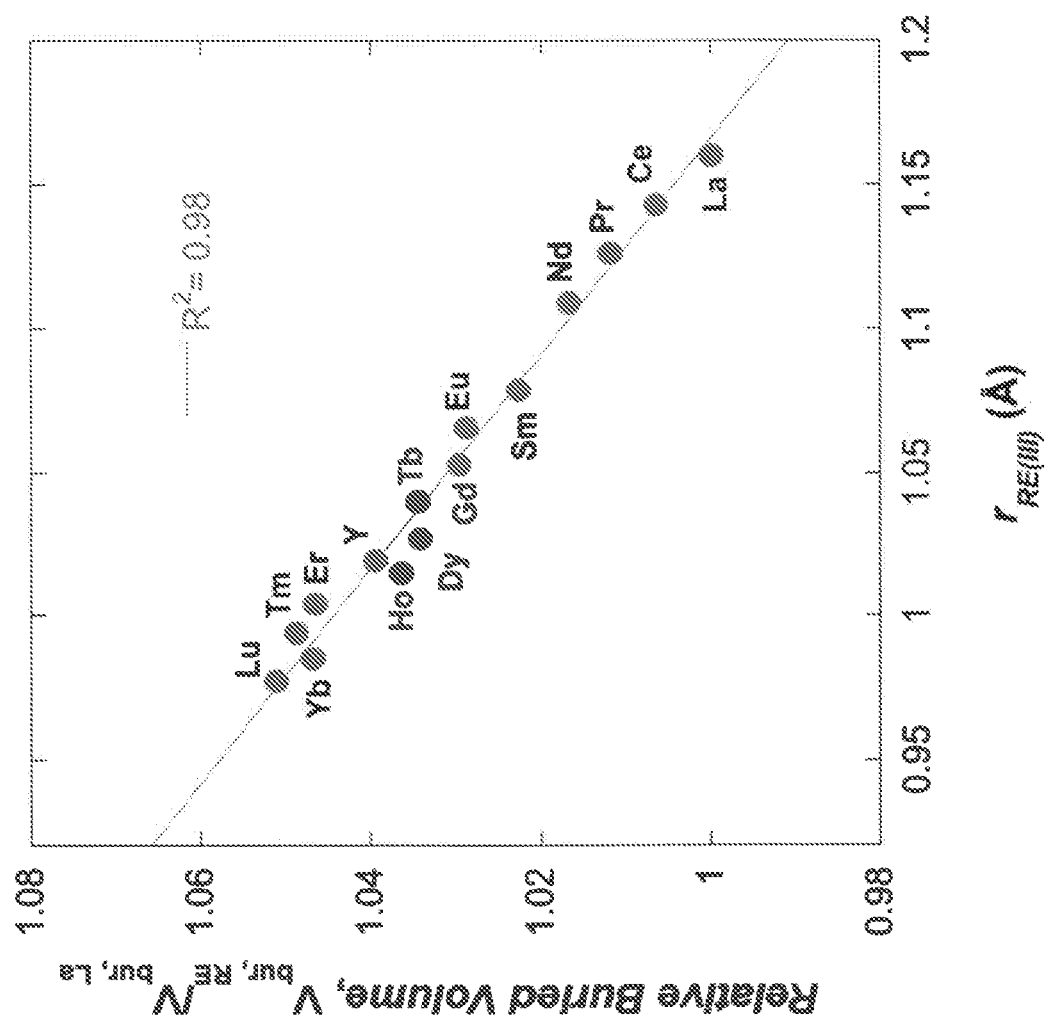
FIG. 20 graphically illustrates a correlation between relative buried volume with respect to ionic radius of the central metal cation for a series of rare earth metal complexes.
Figure 21:
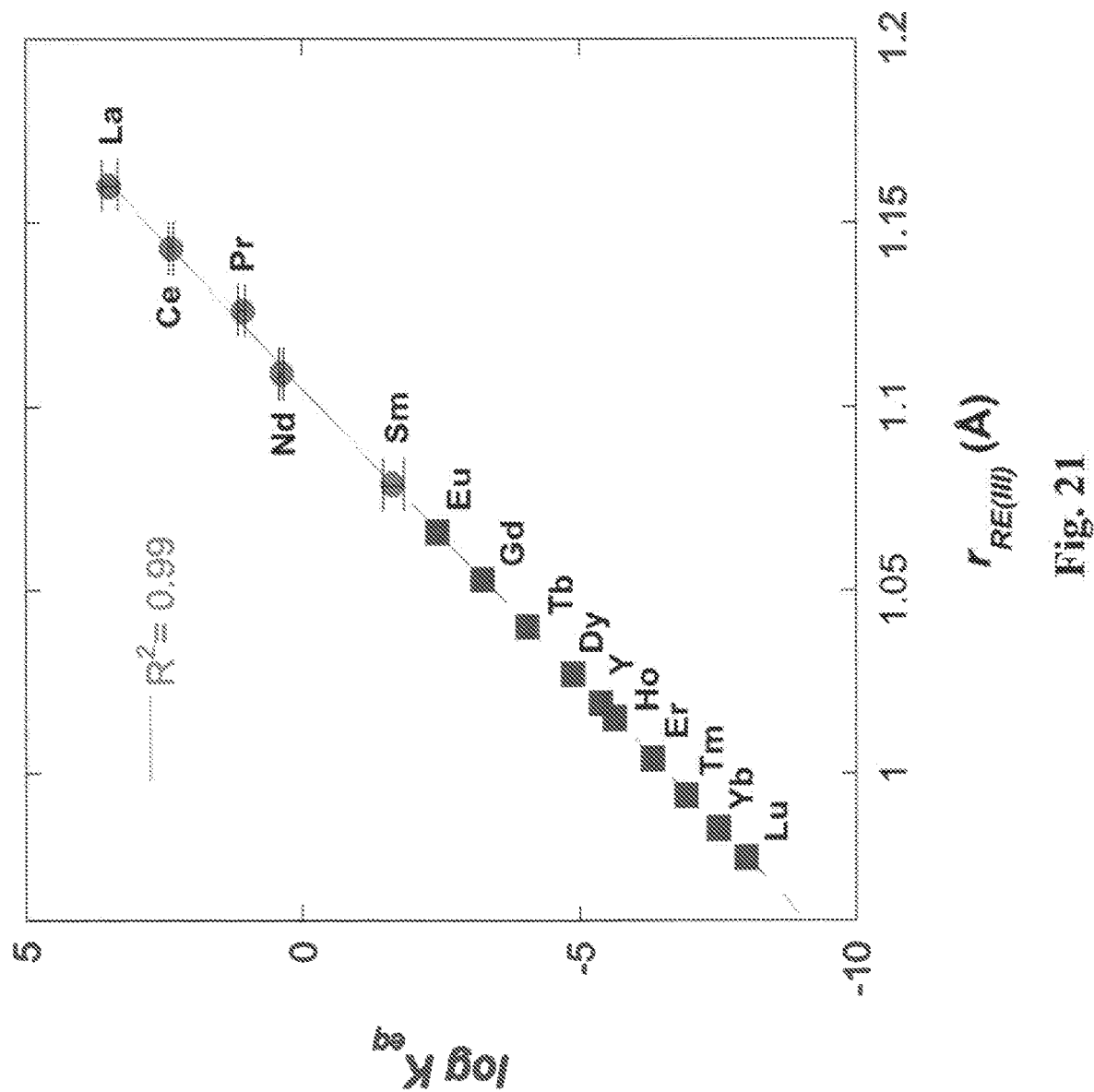
FIG. 21 graphically illustrates a correlation between the logarithm of the experimentally determined self-association equilibrium constants, log K$_{eq}$ for the series of early RE metal complexes, where RE=La to Sm (circular data points), and predicted log K$_{eq}$ values for the late RE metal complexes, where RE=Eu to Lu (square data points).

The presence of significant amounts of 2-RE in benzene solutions of 1-RE, RE=La—Sm, allowed for the determination of the self-association equilibrium constants for these complexes using $^1$H NMR spectroscopy. The results of these experiments indicated that the equilibrium constants decreased by an order of magnitude between adjacent rare earth ions as the series was traversed from larger to smaller ions. Without being limited to any one theory of the invention, this decrease in self-association equilibrium constants across the series was attributed to the closing of the molecular aperture formed by the oxygen atoms of the $TriNOx^{3-}$ ligand, which increased the steric barrier to approach of a second molecule of RE(TriNOx). This hypothesis was supported by the fact that linear correlations to ionic radius of the central metal cation could be made for both % $V_{bur}$ and the logarithm of the self-association equilibrium constants, log $K_{eq}$ (FIGS. 20 and 21).

The linear correlation of log $K_{eq}$ to metal cation radius allowed for the estimation of the self-association equilibrium constants for the 1-RE, RE=Eu—Lu, species. According to these predictions, there was a $10^{11}$-fold decrease in the self-association equilibrium constants across the series as a result of the 0.18 Å decrease in ionic radii.

The high sensitivity of the dimerization equilibrium constants to small changes in ionic radii across the series was promising for targeted separations of the rare earth ions.

While no mixed dimer formation was observed in the Nd and Dy mixtures, the mixed dimer formation was expected in the early/early RE combinations. Indeed, in $C_6D_6$ solutions of 1-La and 1-Ce mixtures, resonances corresponding to 2-La, 2-Ce, and a new species, postulated to be the mixed La/Ce dimer, were observed. Therefore, early/late RE combinations, where the formation of mixed dimers would be unfavorable, were explored for targeted separations.

Separations were performed on mixtures of RE1/RE2 (TriNOx)THF combinations, RE1=La—Eu, RE2=Gd—Lu, and Y. These mixtures were formed by reacting 50:50 mixtures of RE1/RE2(OTf)$_3$ salts with 2 equiv of $H_3TriNOx$ and 6 equiv. of $K[N(SiMe_3)_2]$ in THF. Leaching with 4 mL of benzene followed by a wash of 1 mL of benzene led to filtrates enriched with the larger RE1 and solids enriched with the smaller RE2. The ratios of RE1/RE2 in the filtrate and solid phases were determined by $^1$H NMR and ICP-OES spectroscopies. The results of these separations are tabulated in FIG. 22.

In general, the separations factors, $S_{RE1/RE2}$, increased from larger to smaller RE2 ions across each row for a given RE1 ion. Furthermore, down each column for a given RE2 ion, the separations factors decreased from larger to smaller RE1 ions. These trends were expected due to the greater tendency of the larger RE ions to form higher concentrations of dimeric species and to be extracted into the benzene solutions. Surprisingly, the trends were not linear, however, and decreases in the separation factors were observed, in particular for the very late RE2 ions in each row and the very early RE1 ions in each column. Furthermore, the enrichment factors for the solid and liquid fractions for such separations are set forth in FIGS. 23A and 23B.

The strength of the RE-$O_{THF}$ bond was quantified by thermogravimetric analysis (TGA) on 1-La, 1-Dy, and 1-Lu. In the case of 1-La, two small decreases in weight percent of 3.1% and 8.8% were observed at 50° C. and 118° C., respectively, before complex decomposition was observed as indicated by the large decrease in weight percent at 210° C. These were assigned as the loss of interstitial and bound THF, respectively. In contrast, only one small decrease in weight percent of 12.6% at 58.4° C. was observed before complex decomposition in the case of 1-Dy. This peak corresponded to the dissociation of both interstitial and bound THF, which occurred at unresolved temperatures near 50° C. Finally, no decrease in weight percent was observed prior to complex decomposition in the case of 1-Lu. This indicated that the Lu metal cation could be desolvated under reduced pressure prior to TGA analysis unlike in the cases of 1-La and 1-Dy. These results supported the hypothesis that secondary equilibria involving the dissociation of bound THF were complicating the separations of early/very late RE combinations.

The moderate separations factor of 28.2 for the Eu/Y mixtures had potential implications in the recycling of rare earth containing phosphor materials. Furthermore, the high enrichment factor of 18.3 for Eu in the filtrate fraction suggested that the small separations factor was a result of limited solubility of 1-Eu in benzene solution but that highly pure samples of Eu could be formed with this method.

Figure 24:
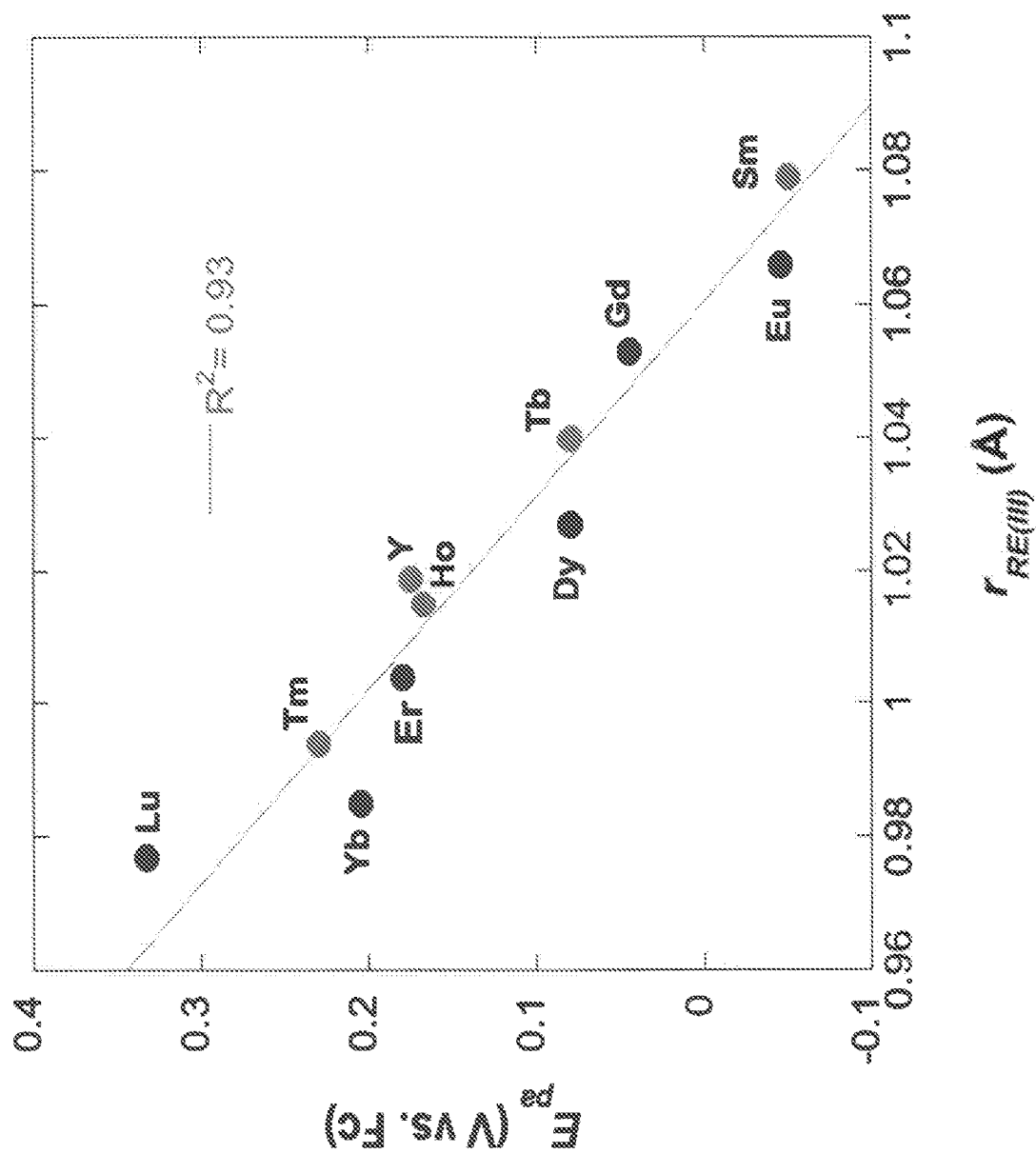
FIG. 24 graphically illustrate a correlation between the E$_{pa}$ of the first oxidation feature versus ionic radius of the central metal cation for 1-RE complexes, where RE=Sm—Lu.

As a possible secondary perturbation to the separations system, the series of 1-RE complexes were examined to determine if they showed differing redox chemistries in dichloromethane solutions. Indeed, differences between the early and late rare earths were observed in solution electrochemistry experiments on the series of 1-RE complexes. FIG. 9 shows the cyclic voltammograms of 1-RE, RE=La—Lu and Y, measured in 0.10 M [$^nPr_4N$][BAr$^F_4$] dichloromethane solutions. The cyclic voltammograms (CVs) of 1-La, 1-Pr, and 1-Nd exhibited two overlapping quasi-reversible ligand oxidation features with $E_{pa}$ between –0.2 V and –0.5 V versus Fc/Fc$^+$ followed by an irreversible ligand oxidation feature with $E_{pa}$ around 0.3 V versus Fc/Fc$^+$. In contrast, the CVs of 1-RE, RE=Eu—Lu, exhibited only one quasi-reversible ligand oxidation feature with $E_{pa}$ ranging from –0.05 V to 0.33 V versus Fc/Fc$^+$. The position of this oxidation wave gradually shifted towards more positive potentials due to the slight increase in Lewis acidity of the central metal cation across the series. Indeed, the $E_{pa}$ values of 1-RE, RE=Eu—Lu, could be correlated to the radius of the central metal cation (FIG. 24). Upon sweeping back to negative potentials, however, two overlapping return reductions were observed, suggesting a chemical process following the electrochemical oxidation—dimer formation upon ligand oxidation.

The CV of 1-Sm exhibited features similar to those in the CVs of the early rare earths and others similar to those in the CVs of the late rare earths. The main ligand oxidation feature occurred with an $E_{pa}$=–0.05 V versus Fc/Fc$^+$. Two overlapping return reductions were observed with $E_{pc}$=–0.60 V and –0.76 V versus Fc/Fc$^+$. This region of the CV resembled that of the 1-RE, RE=Eu—Lu, species. In fact, the value of $E_{pa}$ for the oxidation of 1-Sm also fit the correlation between $E_{pa}$ and ionic radius. Unlike in the CVs of 1-RE, RE=Eu—Lu, however, a small irreversible oxidation feature was observed in that of 1-Sm with an $E_{pa}$=0.46 V versus Fc/Fc$^+$. This feature resembled the irreversible oxidation feature present in the CVs of 1-La, 1-Pr, and 1-Nd.

Despite 1-Ce having a similar solution chemistry as 1-La, 1-Pr, and 1-Nd, the CV of this complex contained a single reversible oxidation feature with $E_{1/2}$=–0.96 V versus Fc/Fc$^+$. These differences in the electrochemistry of 1-Ce were consistent with the oxidation of the central cerium cation occurring at a more favorable thermodynamic potential than the nitroxide moieties of the coordinated TriNOx$^{3-}$ ligand.

The presence of two overlapping return reductions in the CVs of 1-RE, RE=Gd—Lu and Y, suggested that oxidation chemistry could induce dimer formation in the late RE cations and be exploited for late RE/late RE combinations. This compelled us to perform controlled chemical oxidation on 1-Tb in attempts to isolate such a dimeric complex. Based on the $E_{pa}$ value of 0.08 V versus Fc/Fc$^+$ for the ligand oxidation of 1-Tb, silver(I) salts were chosen as oxidants. Reaction of 1-Tb with AgOTf in DCM led to the deposition of silver metal and the formation of an orange terbium containing product. The $^1$H NMR spectrum of this compound indicated full conversion to a new terbium containing compound. Furthermore, reaction of 1-Tb with FcOTf led to the formation of the same product, albeit in less than full conversion based on $^1$H NMR spectroscopy.

The reaction of 1-Tb with Ag[BAr$^F_4$] led to the deposition of Ag$^0$ and the formation of a crude orange terbium containing compound. Cooling a saturated DCM solution of this complex to –25° C. led to the formation of X-ray quality crystals, which confirmed the formation of the dimeric [Tb(TriNOx)]$_2$[BAr$^F_4$]2 species (3-Tb) (FIG. 25).

The solid-state structure of 3-Tb revealed a coordination environment where the $\eta^2$-(N,O) bonding mode for two of the three arms of the TriNOx ligand was retained. The third arm of TriNOx, however, switched hapticity from $\eta^2$-(N,O) bound to $\kappa^1$-O bound as a result of the oxidation. The hapticity change suggested the presence of a localized ligand oxidation and ligand radical-containing product. Indeed, structural metrics indicated that the lengths of the two $\eta^2$-(N,O) bound N—O bonds remained essential unchanged between 3-Tb and 1-Tb. The length of the $\kappa^1$-O bound N—O bond length, however, was significantly reduced from 1.444(2) Å in 1-Tb to 1.275(5) Å in 3-Tb. This 0.17 Å reduction in N—O bond length was consistent with removal of a π* electron of the nitroxide group upon oxidation. DFT calculations performed on 3-Tb corroborated the proposed electronic structure of a localized ligand radical bound to a trivalent Tb$^{III}$ cation.

The formation of a dimer in 3-Tb was noteworthy considering the lack of dimer formation in the fully reduced 1-Tb complex. Dimer formation in 3-Tb was attributed to the opening of the structure (decreasing the percent buried volume) as a result of the $\eta^2$-(N,O) to $\kappa^1$-O hapticity change. This reduction in steric demand shifted the thermodynamics of the self-association equilibrium from heavily favoring monomer towards favoring dimer.

The present invention provides methods for separating rare earth metals from sources containing mixtures of such rare earth metals by exploiting differences in self-association equilibria for the respective rare earth metal ions. The ligands used in the present methods provide size-sensitive molecular apertures of N,O ligands that contribute to new methods for rare earth element separations. Such methods are advantageous for targeted separations because they may eliminate the capital cost associated with mixer-settlers used in liquid-liquid extraction and continuing costs associated with that separations method, making recycling of these critical materials more economically feasible.

While certain embodiments of the present invention have been described and/or exemplified above, various other embodiments will be apparent to those skilled in the art from the foregoing disclosure. The present invention is, therefore, not limited to the particular embodiments described and/or exemplified, but is capable of considerable variation and modification without departure from the scope of the appended claims.

A number of publications and patent documents are cited in the specification in order to describe the state of the art to which this invention pertains. Each of these citations is incorporated herein by reference as though set forth in full.

Furthermore, the transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinary associated with the specified material(s). The term "consisting essentially of" limits the scope of a claim to the specified elements, steps or material(s) and those that do not materially affect the basic and novel characteristic(s) of the claimed invention. The materials and methods can in alternate embodiments, be more specifically defined by any of the transitional terms "comprising", "consisting essentially of" and "consisting of".

REFERENCES

1. J. A. Bogart, et al., "An operationally simple method for separating the rare-earth elements neodymium and dysprosium," Angew. Chem. Int. Ed. Engl. (2015) 54(28): 8222-8225.
2. M. Humphries, Rare Earth Elements: The Global Supply Chain, 2013, pp. 1-26.
3. D. Goll, H. Kronmillller, Naturwissenschaften (2000) 87: 423-438.
4. O. Gutfleisch, M. A. Willard, E. Brick, C. H. Chen, S. G. Sankar, J. P. Liu, Adv. Mater (2011) 23: 821-842.
5. M. Sagawa, S. Fujimura, H. Yamamoto, Y. Matsuura, K. Hiraga, IEEE Trans. Magn. (1984) 20: 1584-1589.
6. K. Binnemans, P. T. Jones, B. Blanpain, T. Van Gerven, Y. Yang, A. Walton, M. Buchert, J. Clean Prod. (2013) 51: 1-22.
7. U. S. Department of Energy, Critical Materials Strategy, Washington, D.C. (2011), pp. 1-191.
8. X. Du, T. E. Graedel, J. Ind. Ecol. (2011) 15:836-843.
9. C. Sonich-Mullin, Rare Earth Elements: A Review of Production, Processing, Recycling and Associated Issues, Cincinatti, 2012.
10. D. Schüler, M. Buchert, R. Liu, S. Dittrich, C. Merz, Study on Rare Earths and Their Recycling, Darmstadt, 2011.
11. T. Elwert, D. Goldmann, F. Romer, World of Metallurgy ERZMETALL (2013) 66: 209-219.
12. T. Elwert, D. Goldmann, F. Roimer, World of Metallurgy ERZMETALL (2014) 67: 287-296.
13. T. Vander Hoogerstraete, B. Blanpain, T. Van Gerven, K. Binnemans, RSC Adv. (2014) 4: 64099-64111.
14. F. Xie, T. A. Zhang, D. Dreisinger, F. Doyle, Miner. Eng. (2014) 56: 10-28.
15. C. K. Gupta, N. Krishnamurthy, in Extractive Metallurgy of Rare Earths, CRC Press, New York, 2005, pp. 1-484.
16. M. Yuan, A. Luo, D. Li, Acta Metall. Sin. (1995) 8: 10-14.
17. X. Wang, W. Li, S. Meng, D. Li, J. Chem. Technol. Biotechnol. (2006) 81: 761-766.
18. A. M. Johnson, M. C. Young, X. Zhang, R. R. Julian, R. J. Hooley, J. Am. Chem. Soc. (2013) 135: 17723-17726.
19. X. Zhao, M. Wong, C. Mao, T. X. Trieu, J. Zhang, P. Feng, X. Bu, J. Am. Chem. Soc. (2014) 136: 12572-12575.
20. Q. Chen, C. Buss, V. Young, Jr., S. Fox, J. Chem. Crystallogr. (2005) 35: 177-181.
21. A. Poater, B. Cosenza, A. Correa, S. Giudice, F. Ragone, V. Scarano, L. Cavallo, Eur. J. Inorg. Chem. (2009) 2009: 1759-1766.
22. G. L. B. Scheffler, F. R. S.; Pozebon, D.; Br. J. Anal. Chem. (2012) 8: 358-365.

What is claimed is:

1. A method for separating, one from another, different metals combined in a source thereof, said metals being selected from the group of rare earth metals consisting of Sc, Y, La, Ce, Pr, Nd, Pm, Sm, Eu, Gd, Tb, Dy, Ho, Er, Tm, Yb, and Lu, the method comprising:
a) establishing a chemical equilibrium in a polar solvent between complexes of the metals sought to be separated, each complex comprising a rare earth metal ion and a ligand capable of binding to said rare earth metal ion, said complexes including a monomer comprising a rare earth metal ion having a relatively smaller ionic radius and a dimer comprising a different rare earth metal ion having a relatively larger ionic radius when the ionic radii of the rare earth metal ions are compared; and either:
b1) replacing the polar solvent with a non-polar solvent, thereby resulting in a solid-liquid mixture, the solid component of the mixture comprising predominantly the rare earth metal having the smaller ionic radius, and the liquid component of the mixture comprising predominantly the rare earth metal having the larger ionic radius; and
b2) separating said solid component from said liquid component; or
c1) applying an oxidizing electrochemical potential or a chemical oxidizing agent to the complexes of the metals sought to be separated, dissolved in a polar solvent, to selectively oxidize the complex having an earlier rare earth metal ion; and
c2) separating the oxidized, earlier rare earth metal ion complexes through differences in solubility or chemical properties using precipitation-filtration or liquid-liquid extraction.

2. The method of claim 1, wherein the metal having the smaller ionic radius is recovered from the solid component.

3. The method of claim 1, wherein the recovered metal is Dy.

4. The method of claim 1, wherein the metal having the larger ionic radius is recovered from the liquid component.

5. The method of claim 1, wherein the recovered metal is Nd.

6. The method of claim 1, wherein said polar solvent is an aprotic polar solvent.

7. The method of claim 1, wherein said source is a rare earth metal-containing magnet, or scrap or waste material generated in the production of said magnet.

8. The method of claim 1, wherein said ligand is a (2-($^t$BuNOH)CH$_2$-C$_6$H$_4$)$_3$N ligand.

9. The method of claim 1, wherein said ligand has the formula:

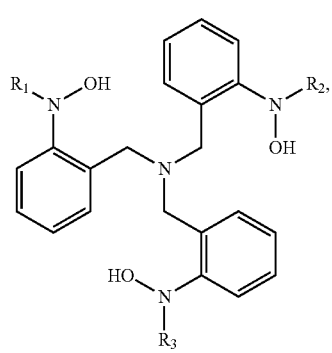

(1)

wherein R$_1$, R$_2$, and R$_3$ may be independently selected from the group consisting of alkyl, aryl, heteroaryl, and a heteroatom.

10. The method of claim 9, wherein the R$_1$, R$_2$, and R$_3$ comprise an alkyl substituent.

11. The method of claim 9, wherein the ligand comprises H$_3$[(2-($^t$BuNO) CH$_2$-C$_6$H$_4$)$_3$N].

12. The method of claim 9, wherein the separation factor is greater than 5.

13. The method of claim 9, wherein the solid component has an enrichment factor of at least 9.

14. The method of claim 9, wherein the liquid component has an enrichment factor of at least 9.

15. The method of claim 1, wherein step a) comprises establishing a chemical equilibrium in a polar solvent between a monomeric rare earth metal complex and a dimeric rare earth metal complex, at least one of the monomeric and dimeric rare earth metal complexes comprising the selected rare earth metal and a ligand, wherein each of the monomeric and dimeric rare earth metal complexes comprise an aperture defined by a monomeric % buried volume (% $V_{bur}$); and wherein step b1) comprises replacing the polar solvent with a non-polar solvent to provide a mixture comprising a solid fraction and a liquid fraction, the solid fraction comprising predominantly the monomeric rare earth metal complex and the liquid fraction comprising predominantly the dimeric rare earth metal complex, wherein the monomeric % $V_{bur}$ of the dimeric rare earth metal complex aperture is less than the monomeric % $V_{bur}$ of the monomeric rare earth metal complex aperture.

16. The method of claim 15, wherein at least one of the monomeric % $V_{bur}$ of the dimeric rare earth metal complex and monomeric metal complex is 50% to 100%.

17. The method of claim 15, wherein the ligand comprises $H_3[(2-(^tBuNO) CH_2-C_6H_4)_3N]$.

\* \* \* \* \*